(12) United States Patent
Shin et al.

(10) Patent No.: US 11,487,613 B2
(45) Date of Patent: Nov. 1, 2022

(54) METHOD FOR ACCESSING SEMICONDUCTOR MEMORY MODULE

(71) Applicant: SAMSUNG ELECTRONICS CO., LTD., Suwon-si (KR)

(72) Inventors: Wonjae Shin, Seoul (KR); Nam Hyung Kim, Suwon-si (KR); Dae-Jeong Kim, Seoul (KR); Do-Han Kim, Hwaseong-si (KR); Minsu Kim, Seongnam-si (KR); Deokho Seo, Suwon-si (KR); Yongjun Yu, Suwon-si (KR); Changmin Lee, Hwaseong-si (KR); Insu Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/105,821

(22) Filed: Nov. 27, 2020

(65) Prior Publication Data

US 2021/0373995 A1 Dec. 2, 2021

(30) Foreign Application Priority Data

May 27, 2020 (KR) .................. 10-2020-0063537

(51) Int. Cl.
*G11C 29/00* (2006.01)
*G06F 11/10* (2006.01)
*G06F 11/16* (2006.01)
*G06F 11/30* (2006.01)

(52) U.S. Cl.
CPC ...... *G06F 11/1068* (2013.01); *G06F 11/1004* (2013.01); *G06F 11/1658* (2013.01); *G06F 11/3037* (2013.01)

(58) Field of Classification Search
CPC ............ G06F 11/1068; G06F 11/1658; G06F 11/3033; G06F 11/1004
See application file for complete search history.

(56) References Cited

U.S. PATENT DOCUMENTS

| | | | |
|---|---|---|---|
| 4,584,681 A | 4/1986 | Singh et al. | |
| 6,493,843 B1 | 12/2002 | Raynham | |
| 7,096,407 B2 | 8/2006 | Olarig | |
| 7,308,566 B2 | 12/2007 | Michaelis et al. | |
| 8,069,377 B2 | 11/2011 | Singh | |
| 8,793,544 B2 | 7/2014 | Johnson et al. | |
| 9,201,748 B2 | 12/2015 | Morris et al. | |
| 10,048,888 B2 | 8/2018 | Willcock et al. | |
| 10,318,365 B2 | 6/2019 | Li et al. | |
| 2008/0077840 A1* | 3/2008 | Shaw | G06F 11/1048 714/E11.049 |
| 2013/0191685 A1 | 7/2013 | Stephens et al. | |

(Continued)

*Primary Examiner* — Samir W Rizk
(74) *Attorney, Agent, or Firm* — Volentine, Whitt & Francos, PLLC

(57) ABSTRACT

A method for accessing a memory module includes; encoding first data of a first partial burst length to generate first parities and first cyclic redundancy codes, encoding second data of a second partial burst length to generate second parities and second cyclic redundancy codes, writing the first data and the second data to first memory devices, and writing the first parities, the first cyclic redundancy codes, the second parities, and the second cyclic redundancy codes to a second memory device and a third memory device.

19 Claims, 23 Drawing Sheets

(56) References Cited

U.S. PATENT DOCUMENTS

2015/0067438 A1* 3/2015 Suzuki ............... G06F 11/1072
  714/758
2018/0152206 A1* 5/2018 Sin ..................... G06F 11/1076
2019/0206477 A1 7/2019 Kim et al.

* cited by examiner

FIG. 9

|      | DQ1 | DQ2 | DQ3 | DQ4 |
|------|-----|-----|-----|-----|
| BL0  |     |     |     |     |
| BL1  |     |     |     |     |
| BL2  |     |     |     |     |
| BL3  |     |     |     |     |
| BL4  |     |     |     |     |
| BL5  |     |     |     |     |
| BL6  |     |     |     |     |
| BL7  |     |     |     |     |
| BL8  |     |     |     |     |
| BL9  |     |     |     |     |
| BL10 |     |     |     |     |
| BL11 |     |     |     |     |
| BL12 |     |     |     |     |
| BL13 |     |     |     |     |
| BL14 |     |     |     |     |
| BL15 |     |     |     |     |

|       | DQ1 | DQ2 | DQ3 | DQ4 |
|-------|-----|-----|-----|-----|
| BL0   |     |     |     |     |
| BL1   |     |     |     |     |
| BL2   |     |     |     |     |
| BL3   |     |     |     |     |
| BL4   |     |     |     |     |
| BL5   |     |     |     |     |
| BL6   |     |     |     |     |
| BL7   |     |     |     |     |
| BL8   |     |     |     |     |
| BL9   |     |     |     |     |
| BL10  |     |     |     |     |
| BL11  |     |     |     |     |
| BL12  |     |     |     |     |
| BL13  |     |     |     |     |
| BL14  |     |     |     |     |
| BL15  |     |     |     |     |

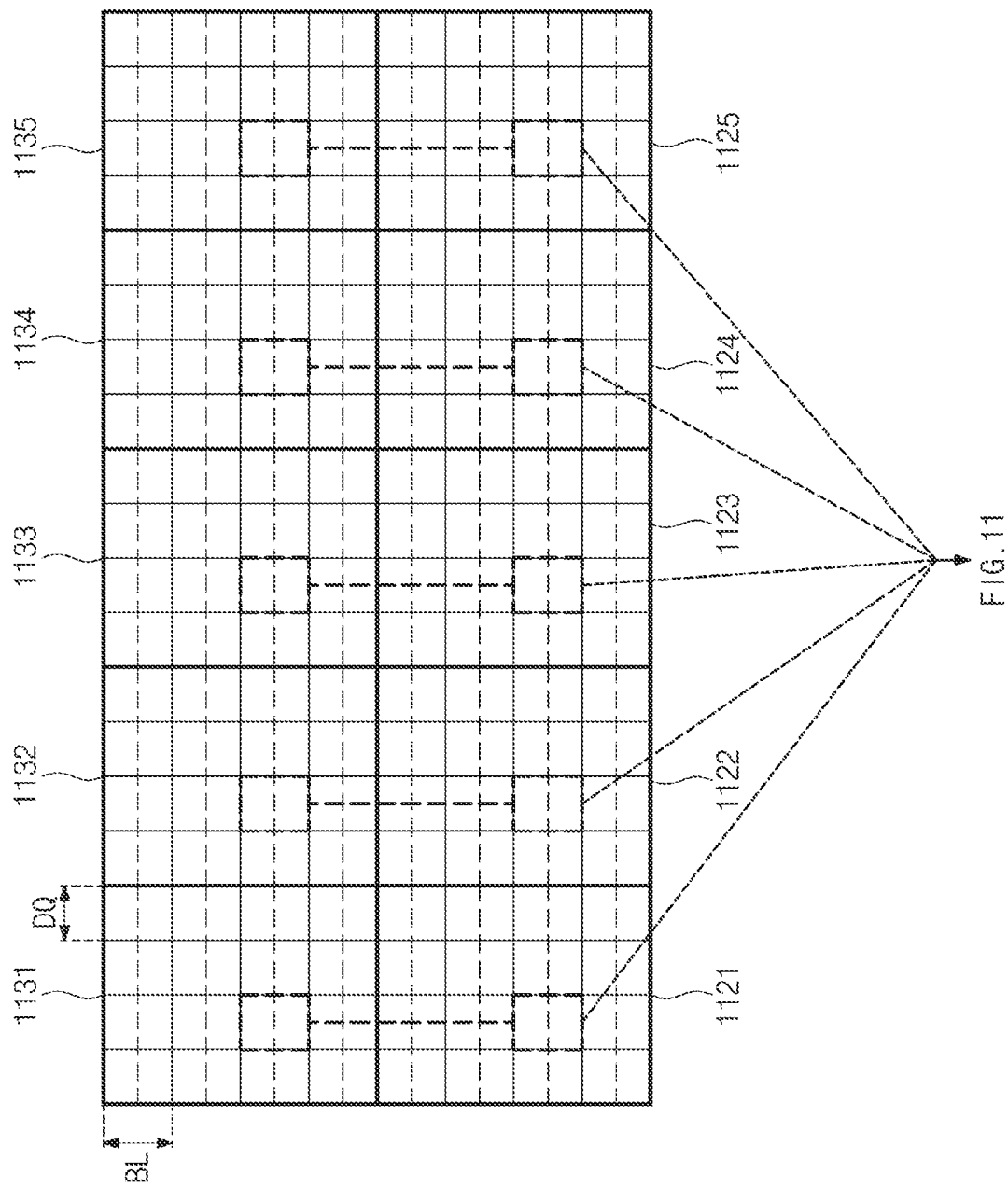

METHOD FOR ACCESSING SEMICONDUCTOR MEMORY MODULE

CROSS-REFERENCE TO RELATED APPLICATIONS

This application claims priority under 35 U.S.C. § 119 to Korean Patent Application No. 10-2020-0063537 filed on May 27, 2020, in the Korean Intellectual Property Office, the subject matter of which is hereby incorporated by reference.

BACKGROUND

Embodiments of the inventive concept relate to semiconductor devices. More particularly, embodiments of the inventive concept relate to methods for accessing a semiconductor memory module supporting an error correction function.

Memory devices are generally configured to store data received from an external host device and to provide the stored data in response to a subsequent request from the external host device. One or more error(s) may occur when data are stored to and/or retrieved from the memory device. Left undetected and uncorrected, such errant data may cause a system error in the external host device. To prevent system errors of this nature, the external host device may include one or more error detection/correction function(s) capable of detecting error(s) in the data retrieved from the memory device and correcting the detected error(s).

As error detection/correction function(s) incorporated into external host devices improve, the probability of system error(s) related to errant data decreases. Unfortunately, improved and emerging error detection/correction functions often demand considerable computing system resources (e.g., computation cycles, processor run time, data storage capacity and/or data communication bandwidth, etc.).

SUMMARY

Embodiments of the inventive concept provide a method for accessing a semiconductor memory module supporting improved error correction function(s).

According to one embodiment, a method for accessing a memory module includes; encoding first data of a first partial burst length to generate first parities and first cyclic redundancy codes, encoding second data of a second partial burst length to generate second parities and second cyclic redundancy codes, writing the first data and the second data to first memory devices, and writing the first parities, the first cyclic redundancy codes, the second parities, and the second cyclic redundancy codes to a second memory device and a third memory device, wherein the first partial burst length and the second partial burst length form a burst length.

According to one embodiment, a method for accessing a memory module includes; storing data in first memory devices, storing first error correction codes in a second memory device and a third memory device, and when an error occurs in at least one memory device among the first memory devices, replacing at least one portion of the at least one memory device with at least one portion of the second memory device.

According to one embodiment, a method for accessing a memory module includes; performing first training on first memory devices, a second memory device, and a third memory device in response to power-on of the memory module, in the first training, when a first faulty memory device is detected among the first memory devices, storing first data in the second memory device and remaining memory devices among the first memory devices, other than the first faulty memory device, and a first error correction code in the third memory device after the first training is completed, and in the first training, when the first faulty memory device is not detected among the first memory devices, storing the first data in the first memory devices and a second error correction code in the second memory device and the third memory device after the first training is completed.

BRIEF DESCRIPTION OF THE DRAWINGS

The above and other objects and features of the inventive concept will become apparent by describing in detail exemplary embodiments thereof with reference to the accompanying drawings.

FIG. 9 is a conceptual diagram illustrating an example in which a data block corresponding to data provides two or more error-independent coverages.

FIG. 10 is a conceptual diagram illustrating an example in which a data block corresponding to a cyclic redundancy code and a parity provides two or more error-independent coverages.

FIG. 11 is a conceptual diagram illustrating another example of data blocks of first memory devices of one channel, for example, a first channel of a memory module.

FIG. 23 is a conceptual diagram illustrating an example of storage spaces of the first memory devices.

DETAILED DESCRIPTION

Certain embodiments of the inventive concept will now be described in some additional detail with reference to the accompanying drawings.

Figure 1:
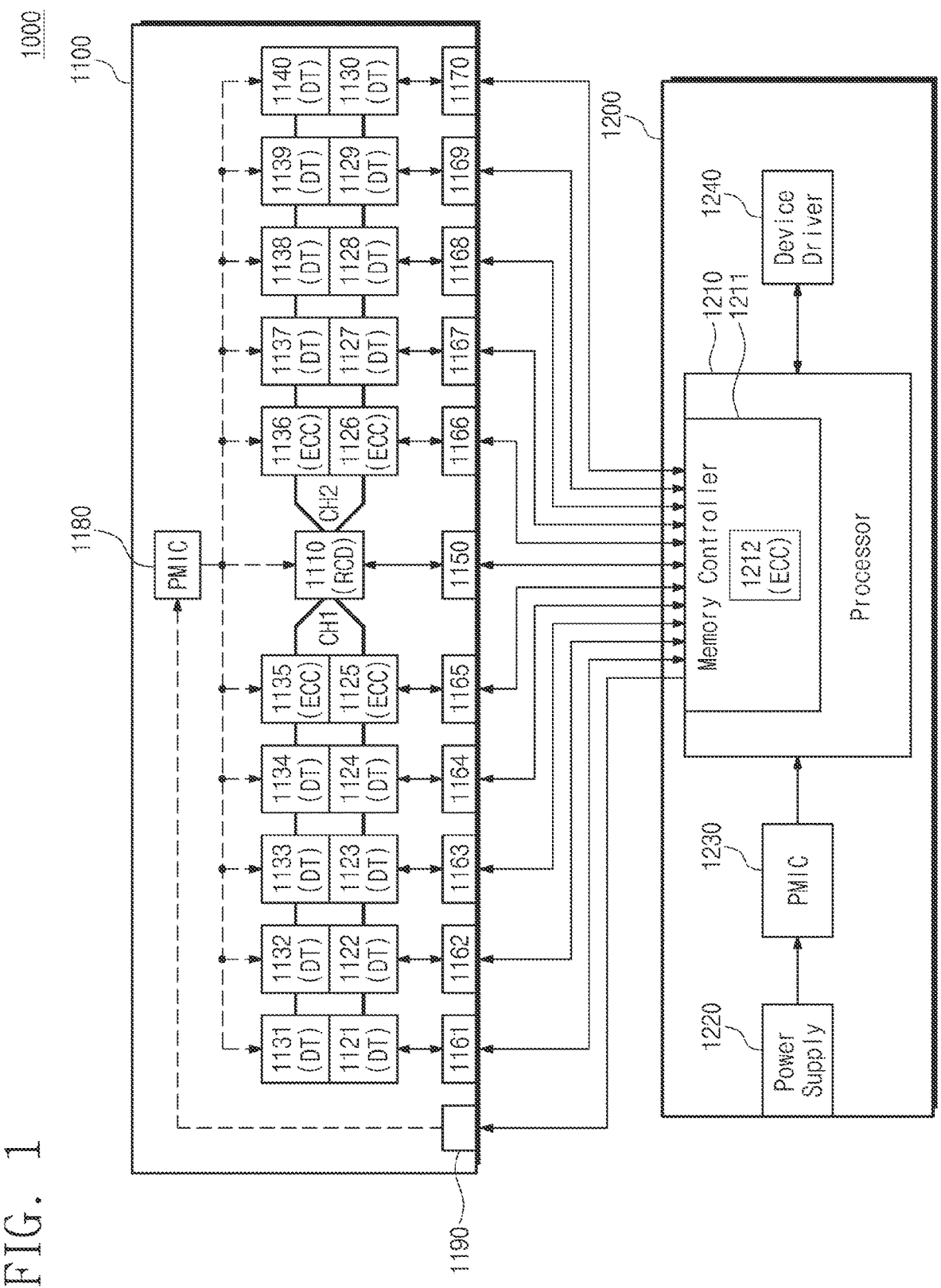
FIG. 1 is a block diagram illustrating a computing system according to embodiments of the inventive concept.

Figure (FIG. 1 is a block diagram illustrating a computing system 1000 according to embodiments of the inventive concept. Here, the computing system 1000 may generally include a memory module 1100 and an external host device 1200.

The memory module 1100 may include a driver 1110, first memory devices (e.g., memory devices 1121 to 1125 and 1131 to 1135), second memory devices (e.g., memory devices 1126 to 1130 and 1136 to 1140), a driver connector 1150, first memory connectors 1161 to 1165, second memory connectors 1166 to 1170, a power management circuit 1180 and a power connector 1190.

The driver 1110 may be variously configured to communicate a variety of signals (e.g., at least one of data signals, address signals, instruction signals, command signals, control signals, clock signals, etc.) with the external host device 1200 through the driver connector 1150. For example, the driver 1110 may receive a command CMD, an address ADDR and a clock signal CK from the external host device 1200. The driver 1110 may communicate control signals CTRL with the external host device 1200. (See. e.g., FIG. 2).

The driver 1110 may receive a unidirectional control signal from the external host device 1200, and reply with at least one of a bidirectional control signal or a unidirectional control signal to the external host device 1200.

The driver 1110 may transfer the command CMD and the address ADDR to the first memory devices 1121 to 1125 and 1131 to 1135 through a first channel CH1. The driver 1110 may also transfer control signals received from the external host device 1200 to the first memory devices 1121 to 1125 and 1131 to 1135 through the first channel CH1.

In response to a command received from the external host device 1200, the driver 1110 may transfer control signals received from the first memory devices 1121 to 1125 and 1131 to 1135 through the first channel CH1 to the external host device 1200. The control signals CTRL communicated by the driver 1110 to the external host device 1200 may be the same, partially the same, or different from the control signals communicated by the driver 1110 to the first memory devices 1121 to 1125 and 1131 to 1135.

In similar manner, the driver 1110 may communicate with the second memory devices 1126 to 1130 and 1136 to 1140 through a second channel CH2.

In some embodiments, the driver 1110 may be a register clock driver (RCD), such as those defined by applicable technical standard related to a Dual In-line Memory Module (DIMM). In one particular embodiment, the driver 1110 may be a RCD defined in relation to a dual data rate fifth-generation synchronous dynamic random access memory (DDR5 SRAM) DIMM.

The first memory devices 1121 to 1125 and 1131 to 1135 may communicate with the external host device 1200 through the first memory connectors 1161 to 1165. For example, the first memory devices 1121 to 1125 and 1131 to 1135 may communicate data signals DQ and data strobe signals DQS with the external host device 1200. (See. e.g., FIG. 2).

The second memory devices 1126 to 1130 and 1136 to 1140 may communicate with the external host device 1200 through the second memory connectors 1166 to 1170. For example, the second memory devices 1126 to 1130 and 1136 to 1140 may communicate the data signals DQ and the data strobe signals DQS with the external host device 1200.

In certain embodiments, the first memory devices 1121 to 1125 and 1131 to 1135 and the second memory devices 1126 to 1130 and 1136 to 1140 may be a DDR5 SDRAM. And the first memory devices 1121 to 1125 and 1131 to 1135 and the second memory devices 1126 to 1130 and 1136 to 1140 may communicate with the external host device 1200 in accordance with one or more technical standards related to DIMMs, and the DDR5 SDRAM DIMM standard in particular.

Depending on the nature of request(s) received from the external host device 1200, the first memory devices 1121 to 1125 and 1131 to 1135 and the second memory devices 1126 to 1130 and 1136 to 1140 may simultaneously receive data signals DQ and/or write the received data signals DQ. Depending on the nature of request(s) received from the external host device 1200, the first memory devices 1121 to 1125 and 1131 to 1135 and the second memory devices 1126 to 1130 and 1136 to 1140 may simultaneously read the data signals DQ and/or may write the read data signals DQ.

In response to certain request(s) form the external host device 1200, the first memory devices 1121 to 1125 and 1131 to 1135 and/or the second memory devices 1126 to 1130 and 1136 to 1140 may sequentially receive or sequentially output the data signals DQ up to a number of times in accordance with a defined burst length BL. For example, one burst length BL of sixteen (16) is defined in relation to the DDR5 SDRAM DIMM technical standard(s).

In some embodiments, the number of communicated data signals DQ associated with the DDR5 SDRAM may actual decrease, as compared with certain legacy memory devices (e.g., DDR4 SDRAM). For example, the external host device 1200 may be configured to communicate the 64-byte data signals DQ through each of the first memory connectors 1161 to 1165 and the second memory connectors 1166 to 1170. And in order to support compatibility with 64 byte data, the first memory devices 1121 to 1125 and 1131 to 1135 and the second memory devices 1126 to 1130 and 1136 to 1140 may be configured to communicate data using the burst length BL of 16.

Accordingly, in response to a single write request or a single read request received from the external host device 1200, the first memory devices 1121 to 1125 and 1131 to 1135 and the second memory devices 1126 to 1130 and 1136 to 1140 may receive the data signals DQ continuously 16 times, or may output the data signals DQ continuously 16 times.

Each of the first memory connectors 1161 to 1165 and the second memory connectors 1166 to 1170 may be connected with two (2), vertically arranged, memory devices. That is, each of the first memory devices 1121 to 1125 and 1131 to 1135 and the second memory devices 1126 to 1130 and 1136 to 1140 may communicate with the external host device 1200 in units of 32 bytes. Each of the first memory devices 1121 to 1125 and 1131 to 1135 and the second memory devices 1126 to 1130 and 1136 to 1140 may be a (x4) memory device that communicates four (4) data signals DQ with the external host device 1200.

The power management circuit 1180 may receive at least one external power signal(s) from the external host device 1200 through the power connector 1190, and the power management circuit 1180 may generate various internal power signals from the at least one external power signal(s). For example, the power management circuit 1180 may supply the internal power signal(s) to the driver 1110, the first memory devices 1121 to 1125 and 1131 to 1135, and the second memory devices 1126 to 1130 and 1136 to 1140.

In some embodiments, the power management circuit 1180 may be a power management integrated circuit (PMIC) defined in accordance with one or more standards associated with the DDR5 SDRAM DIMM.

In some embodiments, the memory module 1100 of FIG. 1 may be a registered DIMM (RDIMM), an unbuffered DIMM (UDIMM), a load reduced DIMM (LRDIMM), a fully buffered DIMM (FBDIMM), etc.

Those skilled in the art will recognize that the memory module 1100, however specifically configured, may be designed or modified-in-design to comply with one or more technical standard(s), such as the technical standard(s) associated with the RDIMM. Certain modifications may result in the change, addition and/or removal of one or more component(s) defined by one or more technical standard(s).

In the illustrated example of FIG. 1, the external host device 1200 may include a processor 1210, a power supply 1220, a host power management circuit 1230, and a device driver 1240. The processor 1210 may include a general-purpose processor such as a central processing unit (CPU), and a special purpose processor such as an application processor (AP), a graphic processing unit (GPU), a neuromorphic processor (NP), or a neuromorphic processor.

The processor 1210 may include a memory controller 1211. The memory controller 1211 may control the memory module 1100 and may communicate with the memory module 1100. The communication of data and other signal(s) with the external host device 1200 described with reference to the memory module 1100 may be performed, at least in part, by the memory controller 1211.

The memory controller 1211 may include an error correction circuit 1212, wherein the error correction circuit 1212 may be configured to generate error correction code (ECC). When the memory controller 1211 writes data DT to the memory module 1100, the memory controller 1211 may generate various ECC that may be used to detect and/or correct data error(s) in the data DT.

The memory controller 1211 may write the data DT to the first memory devices 1121 to 1124 and 1131 to 1134 (hereafter, "first memory devices for data 1121 to 1124 and 1131 to 1134") being a part of the first memory devices 1121 to 1125 and 1131 to 1135, and may also write the ECC to the first memory devices 1125 and 1135 (hereafter, "first memory devices for ECC 1125 and 1135") being the remaining memory devices of the first memory devices 1121 to 1125 and 1131 to 1135.

The memory controller 1211 may write the data DT to the second memory devices 1127 to 1130 and 1137 to 1140 (hereafter, "second memory devices for data 1127 to 1130 and 1137 to 1140") being a part of the second memory devices 1126 to 1130 and 1136 to 1140, and may also write the ECC to the second memory devices 1126 and 1136 (hereafter "second memory devices for ECC 1126 and 1136") being the remaining memory devices of the second memory devices 1126 to 1130 and 1136 to 1140.

In some embodiments, the ECC may include cyclic redundancy code "C" for detecting error(s) and parity "P" information for correcting the detected error(s). (See, e.g., FIG. 11). The memory controller 1211 may read the data DT and the ECC from the memory module 1100 and perform error detection and/or correction (hereafter, detection/correction).

The power supply 1220 of the external host device 1200 may generate the external power signal(s) used to drive the computing system 1000. In this regard, the external power signal(s) may be provided to the host power management circuit 1230, and the host power management circuit 1230 may generate internal power signal(s) necessary to drive the external host device 1200. Here, the host power management circuit 1230 may be a PMIC designed and manufactured in view of computing system demands placed on the external host device 1200. The host power management circuit 1230 may supply the internal power signal(s) to the processor 1210 and components of the external host device 1200.

The device driver 1240 may control various additional devices under control of the processor 1210. For example, the device driver 1240 may be connected with various devices such as a storage device, a modem, and a user interface device and may arbitrate the communication between the various devices and the processor 1210.

The number of first memory devices 1121 to 1125 and 1131 to 1135 and the number of second memory devices 1126 to 1130 and 1136 to 1140 may vary by design and are not limited to only the illustrated examples presented or described herein.

Figure 2:
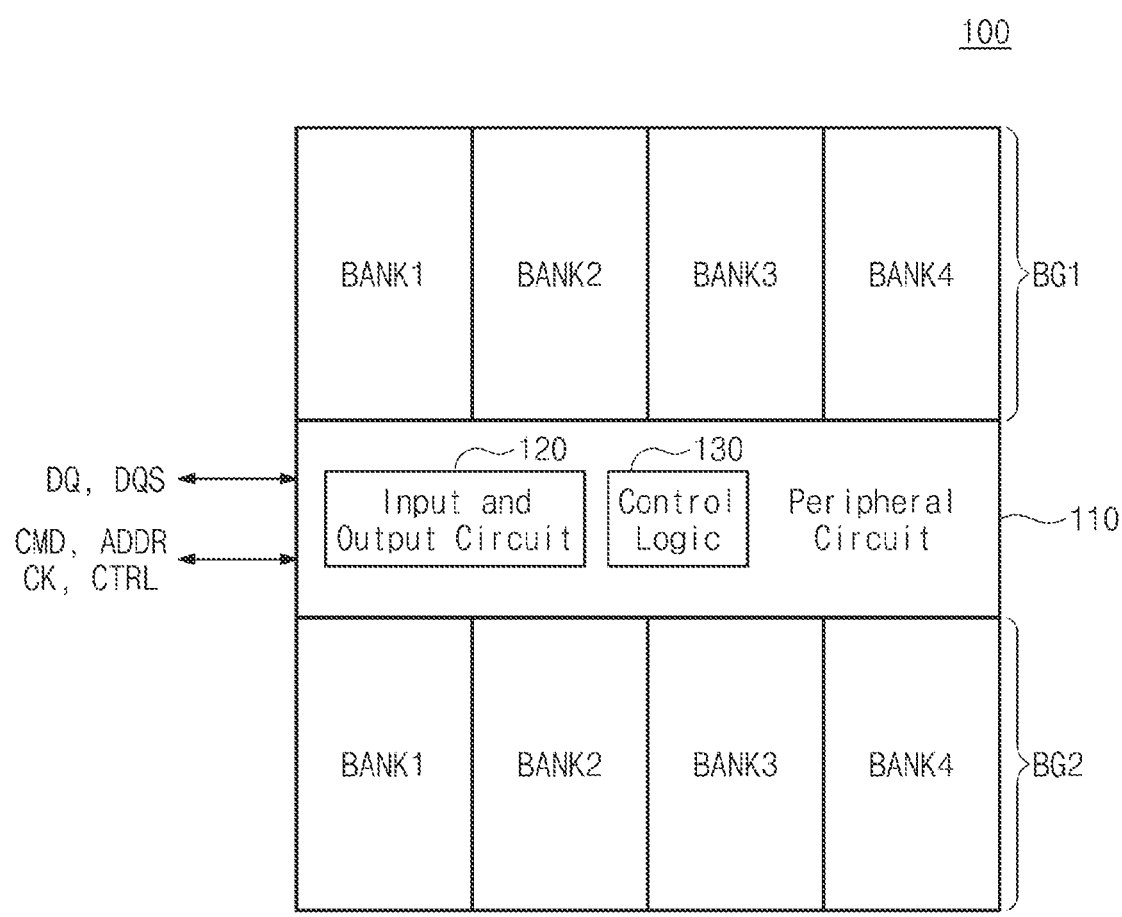
FIG. 2 is a block diagram illustrating a memory device according to embodiments of the inventive concept.

FIG. 2 is a block diagram illustrating a memory device 100 according to embodiments of the inventive concept. Here, the memory device 100 may correspond to one of the first memory devices 1121 to 1125 and 1131 to 1135 and/or of the second memory devices 1126 to 1130 and 1136 to 1140 previously described in relation to FIG. 1. In some embodiments, the first memory devices 1121 to 1125 and 1131 to 1135 and the second memory devices 1126 to 1130 and 1136 to 1140 may have the same structure and may perform substantially the same operation(s).

Referring to FIGS. 1 and 2, the memory device 100 may include a first bank group BG1 and a second bank group BG2. Each of the first bank group BG1 and the second bank group BG2 may include first to fourth banks BANK1 to BANK4. The first to fourth banks BANK1 to BANK4 of the first bank group BG1 and the second bank group BG2 may have the same structure and may perform the same operation.

Each of the first to fourth banks BANK1 to BANK4 may include a plurality of memory cells. The memory cells may be used to store the data DT or the ECC transferred from the external host device 1200.

The memory device 100 may further include a peripheral circuit 110. The peripheral circuit 110 may communicate the control signals CTRL with the external host device 1200. The peripheral circuit 110 may receive the command CMD, the address ADDR, and the clock signal CK from the external host device 1200. The peripheral circuit 110 may select a bank, which the address ADDR indicates, from among the first to fourth banks BANK1 to BANK4 of the first bank group BG1 and the second bank group BG2.

The peripheral circuit 110 may control the selected bank such that an operation directed by the command CMD, for example, a write operation or a read operation is performed on memory cells indicated by the address ADDR from among the memory cells of the selected bank. The peripheral circuit 110 may communicate the data signals DQ and the data strobe signals DQS with the external host device 1200. The data strobe signals DQS may be used to transfer timings to latch the data signals DQ.

The peripheral circuit 110 may include an input and output circuit 120 configured to exchange the data signals DQ and the data strobe signals DQS with the external host device 1200. The peripheral circuit 110 may further include control logic 130 configured to control the selected bank in response to the command CMD, the address ADDR, the clock signal CK, and the control signals CTRL.

The number of bank groups, as well as the number of banks, may vary by design and the scope of the inventive concept is not limited to only the illustrated examples.

Figure 3:
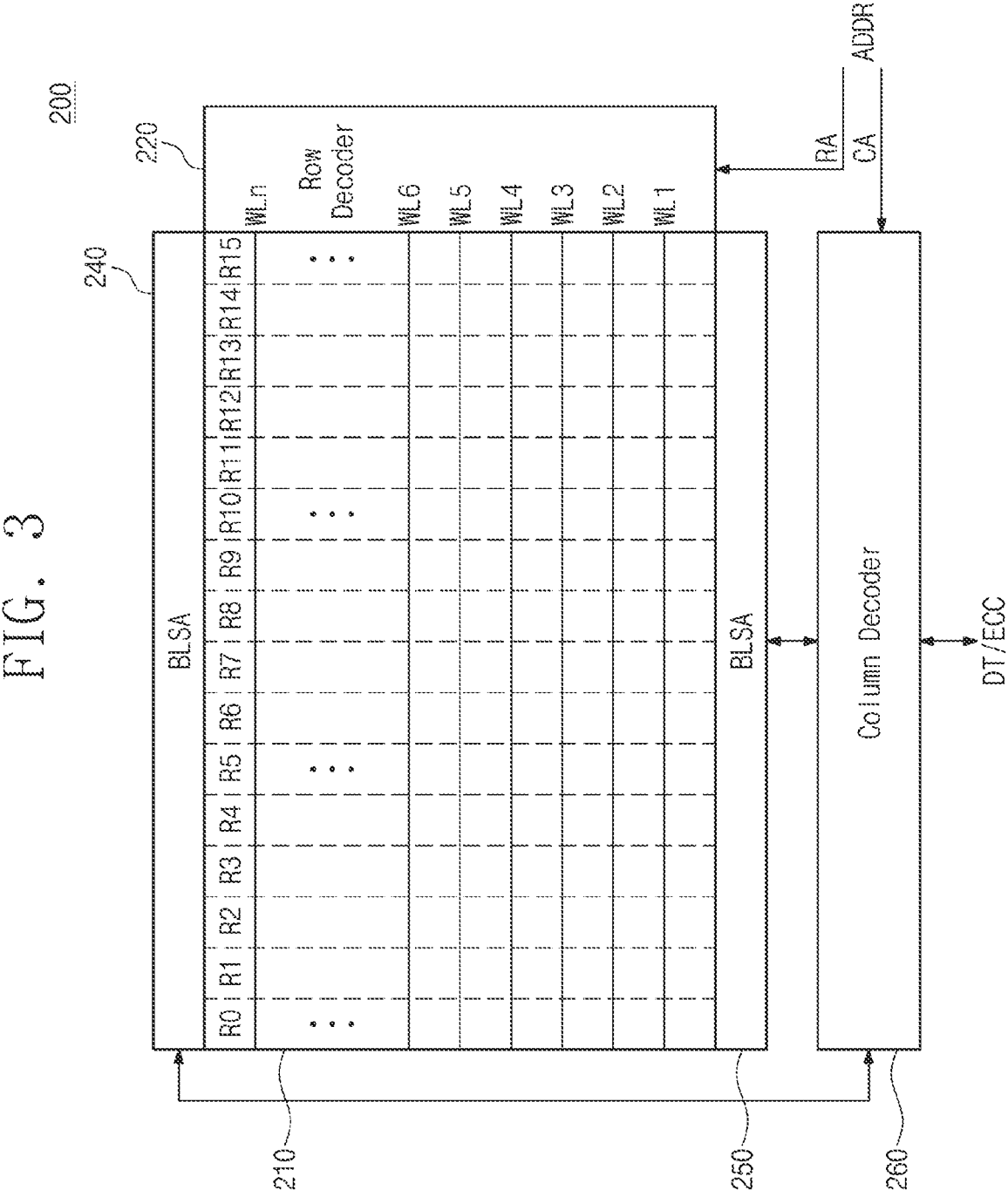
FIG. 3 is a block diagram illustrating a bank according to embodiments of the inventive concept.

FIG. 3 illustrates a bank 200 according to embodiments of the inventive concept. Here, the bank 200 may correspond to be one of the first to fourth banks BANK1 to BANK4 of the first bank group BG1 and/or one of the second bank group BG2 previously described in relation to FIG. 2.

Referring to FIGS. 1 to 3, the bank 200 may include a memory cell array 210, a row decoder 220, a first bit line sense amplifier (BLSA) 240, a second bit line sense amplifier 250, and a column decoder 260.

The memory cell array 210 may include memory cells arranged along a row direction and a column direction. The memory cell array 210 may include zeroth (0-th) to fifteenth (15-th) regions R0 to R15. The 0-th to 15-th regions R0 to R15 may correspond to a defined burst length BL (e.g., 2, 4, 8, 16, 32, etc.). For example, assuming a burst length BL of 8, the number of regions of the memory cell array 210 may be 8, and assuming a burst length BL of 32, the number of regions of the memory cell array 210 may be 32.

The row decoder 220 may be connected with memory cells in rows through word lines WL1 to WLn (where 'n' is a positive integer). The row decoder 220 may receive a row address RA of the address ADDR and may select one of the first to n-th word lines WL1 to WLn in response to the row address RA. For example, the row decoder 220 may apply a voltage for activation (e.g., a positive voltage) to the selected word line.

The first bit line sense amplifier 240 and the second bit line sense amplifier 250 may be connected with memory cells in columns through bit lines. Bit lines connected with the first bit line sense amplifier 240 may be different from bit lines connected with the second bit line sense amplifier 250. For example, the first bit line sense amplifier 240 may be connected with even-numbered (or odd-numbered) bit lines along the row direction, and the second bit line sense amplifier 250 may be connected with odd-numbered (or even-numbered) bit lines along the row direction.

The first bit line sense amplifier 240 and the second bit line sense amplifier 250 may apply voltages to the bit lines or may sense voltages of the bit lines. By adjusting or sensing voltages of the bit lines, the first bit line sense amplifier 240 and the second bit line sense amplifier 250 may perform the write operation or the read operation on memory cells of the selected row.

The column decoder 260 may receive a column address CA of the address ADDR. The column decoder 260 may electrically connect a part of the bit lines with the peripheral circuit 110 in response to the column address CA. In some embodiments, the column decoder 260 may output the data DT or the ECC corresponding to the burst length BL of 16 by sequentially selecting the 0-th to 15-th regions R0 to R15 and outputting data read from memory cells of a region thus selected.

An example is illustrated as the memory cell array 210 includes the 0-th to 15-th regions R0 to R15. However, the memory cell array 210 may include a plurality of sub-arrays, and each sub-array may include the 0-th to 15-th regions R0 to R15. During the write operation or the read operation, one of a plurality of sub-arrays may be selected, and the write operation or the read operation may be performed in the 0-th to 15-th regions R0 to R15 in the selected sub-array in units of the burst length BL.

In relation to FIG. 3, the column decoder 260 is assumed to be in the bank 200. However, the column decoder 260 may alternately be included in the peripheral circuit 110. In a case where the column decoder 260 is included in the peripheral circuit 110, the column decoder 260 may control the input and/or output of the data DT or the ECC associated with one bank selected from the first to fourth banks BANK1 to BANK4 of the first bank group BG1 and the second bank group BG2. That is, the column decoder 260 may be applied in common to the first to fourth banks BANK1 to BANK4 of the first bank group BG1 and the second bank group BG2.

Figure 4:
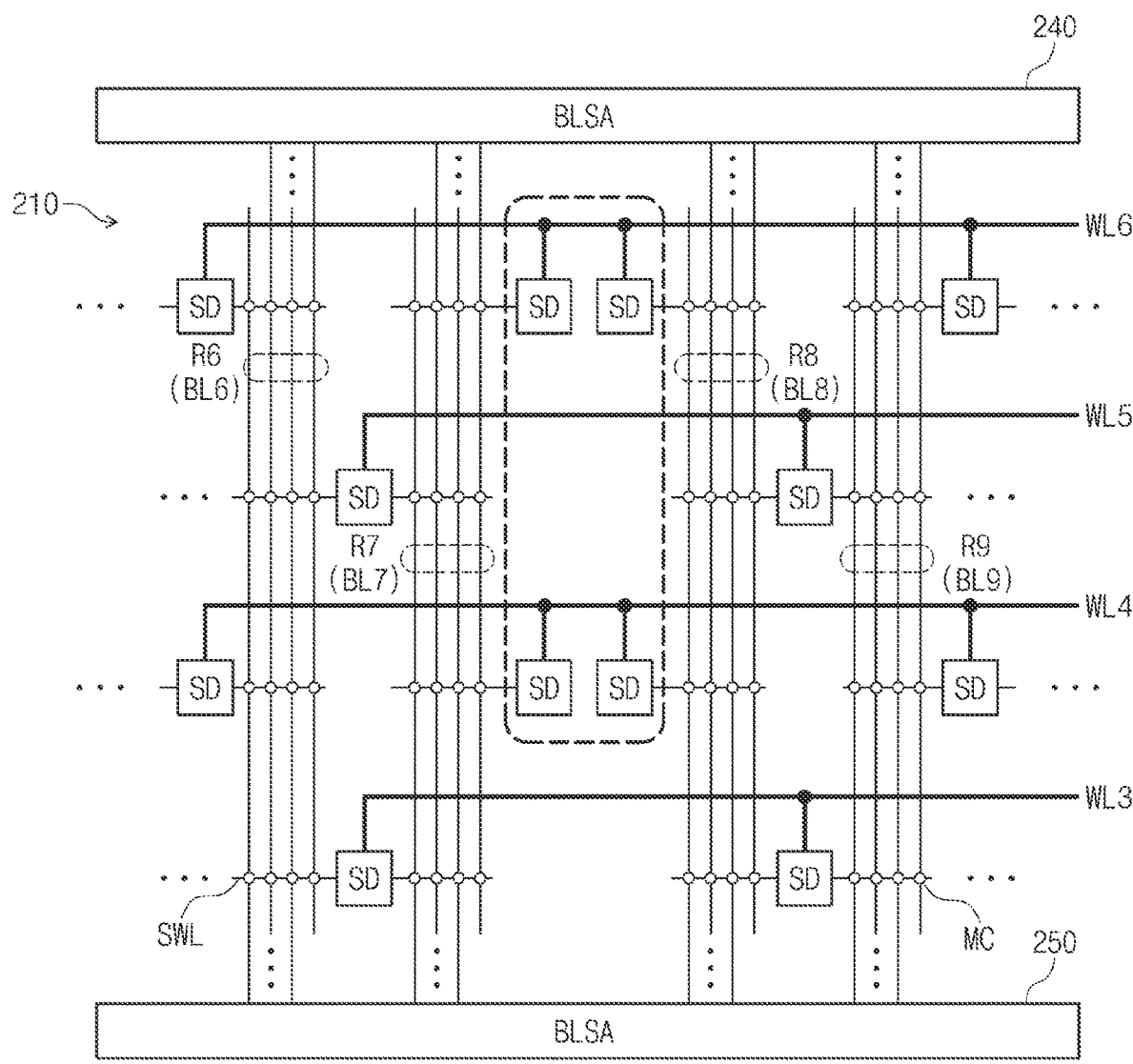
FIG. 4 is a conceptual diagram illustrating a portion of the memory cell array of FIG. 3.

FIG. 4 is a conceptual diagram illustrating in part the memory cell array 210 of FIG. 3. Referring to FIGS. 1, 2, 3 and 4, the memory cell array 210 may include memory cells MC (respectively indicated as circles). The memory cells MC may be connected with sub-word line drivers SD through sub-word lines SWL. The sub-word line drivers SD may be connected with word lines (e.g., the third to sixth word lines WL3 to WL6).

The 0-th to 15-th regions R0 to R15 may respectively correspond to a burst length BL of 16. For example, the sixth to ninth regions R6 to R9 may respectively correspond to sixth to ninth burst lengths BL6 to BL9, as illustrated in FIG. 4.

In the seventh (7-th) region R7, the memory cells MC corresponding to the fourth word line WL4 and the sixth word line WL6 may be connected with sub-word lines placed on the left of the corresponding sub-word line drivers SD. The memory cells MC corresponding to the third word line WL3 and the fifth word line WL5 may be connected with sub-word lines placed on the right of the corresponding sub-word line drivers SD.

During the write operation and/or the read operation, at least one of sub-word line drivers SD (or sub-word lines SWL) connected with a selected word line may be selected. The write operation and/or the read operation may be performed on the memory cells MC connected with sub-word lines SWL connected with at least one selected sub-word line driver, or on the memory cells MC connected with at least one selected sub-word line SWL.

In some embodiments, decoding lines for selecting at least one of sub-word line drivers SD connected with a selected word line or at least one of sub-word lines may be further provided. The decoding lines may be controlled by the row decoder 220 based on the row address RA. Here, the decoding lines have been omitted for clarity.

Thus, the sub-word line drivers SD connected with the third to sixth word lines WL3 to WL6 may be disposed, in turn, on the left and the right of the sixth region R6 along the column direction. Likewise, in each of the 0-th to fifth regions R0 to R5 and the 7-th to 15-th regions R7 to R15, the sub-word line drivers SD may be disposed, in turn, on the left and the right of the corresponding region along the column direction.

In some embodiments, in the 7-th region R7 and the eighth (8-th) region R8—respectively corresponding to the 7-th burst length BL7, and the 8-th burst length BL8—the sub-word line drivers SD may be provided independent of each other. That is, the sub-word lines SWL of the 7-th region R7 may be driven independent of the sub-word lines SWL of the 8-th region R8.

Error(s) occurring in any of the sub-word line drivers SD associated with the 0-th to 7-th regions R0 to R7 may not affect the 8-th to 15-th regions R8 to R15. Likewise, error(s) occurring in any of the sub-word line drivers SD associated with the 8-th to 15-th regions R8 to R15, may not affect the 0-th to 7-th regions R0 to R7.

Accordingly, the 0-th to 7-th regions R0 to R7 and the 8-th to 15-th regions R8 to R15 may be sections that are independent of each other with regard to a row-dependent error(s). Accordingly, the 0-th to 7-th burst lengths BL0 to BL7 and the 8-th to 15-th burst lengths BL8 to BL15 of a data block may be error-independent.

In each of the 0-th to 15-th regions R0 to R15, the first bit line sense amplifier 240 may be connected with even-numbered bit lines. In each of the 0-th to 15-th regions R0 to R15, the second bit line sense amplifier 250 may be connected with odd-numbered bit lines.

In some embodiments, four (4) memory cells MC may be connected with one sub-word line SWL. Memory cells MC connected with one sub-word line SWL may be simultaneously written or may be simultaneously read. Four (4) memory cells MC connected with one sub-word line SWL may correspond to 4 data signals DQ, respectively.

In some embodiments, a plurality of memory cell groups may be connected with one sub-word line SWL. Each of the plurality of memory cell groups may include memory cells MC respectively corresponding to data signals DQ that the memory device 100 simultaneously receives or outputs (e.g., four (4) memory cells MC).

During the write operation or the read operation, one of a plurality of memory cell groups connected with one sub-word line SWL may be selected. The write operation or the read operation may be performed on memory cells of the selected memory cell group.

Figure 5:
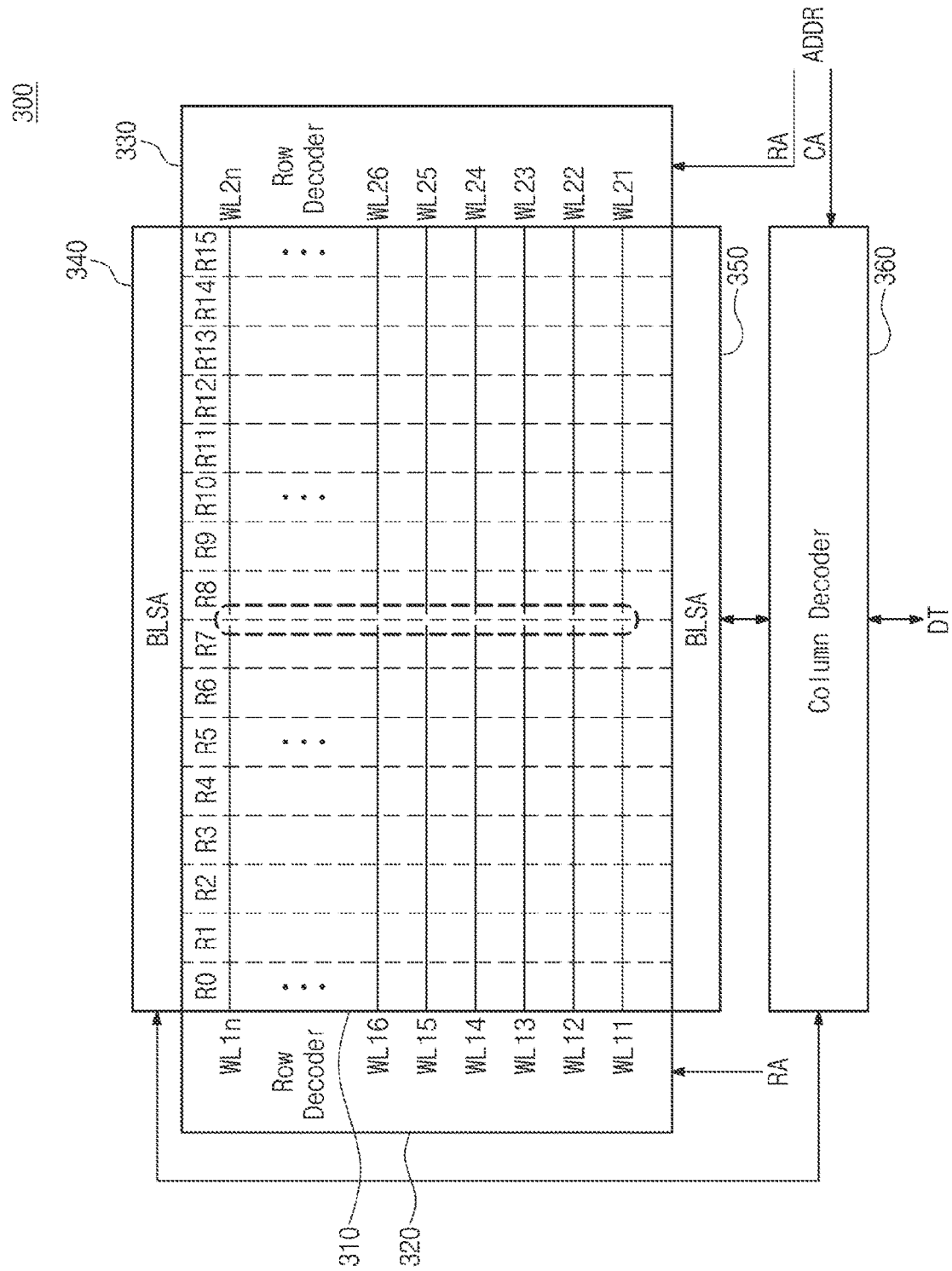
FIG. 5 is a block diagram illustrating another example of a bank having a structure for supporting error-independent coverages or sections independent of each other with regard to a row-dependent error.

FIG. 5 is a block diagram illustrating another example of a bank 300 having a structure that supports error-independent coverages or independent sections, with respect to a row-dependent error(s). Referring to FIGS. 1, 2, and 5, the bank 300 may include a memory cell array 310, a first row decoder 320, a second row decoder 330, a first bit line sense amplifier 340, a second bit line sense amplifier 350, and a column decoder 360.

Here, the structure and operation of the bank 300 may be the same as the bank 200 of FIG. 3, except for the provision of the first row decoder 320 and the second row decoder 330.

The first row decoder 320 may be connected with 11-th to 1n-th word lines WL11 to WL1n. The 11-th to 1n-th word lines WL11 to WL1n may be connected with memory cells of the 0-th to 7-th regions R0 to R7. The second row decoder 330 may be connected with 21-th to 2n-th word lines WL21 to WL2n. The 21-th to 2n-th word lines WL21 to WL2n may be connected with memory cells of the 8-th to 15-th regions R8 to R15.

Figure 6:
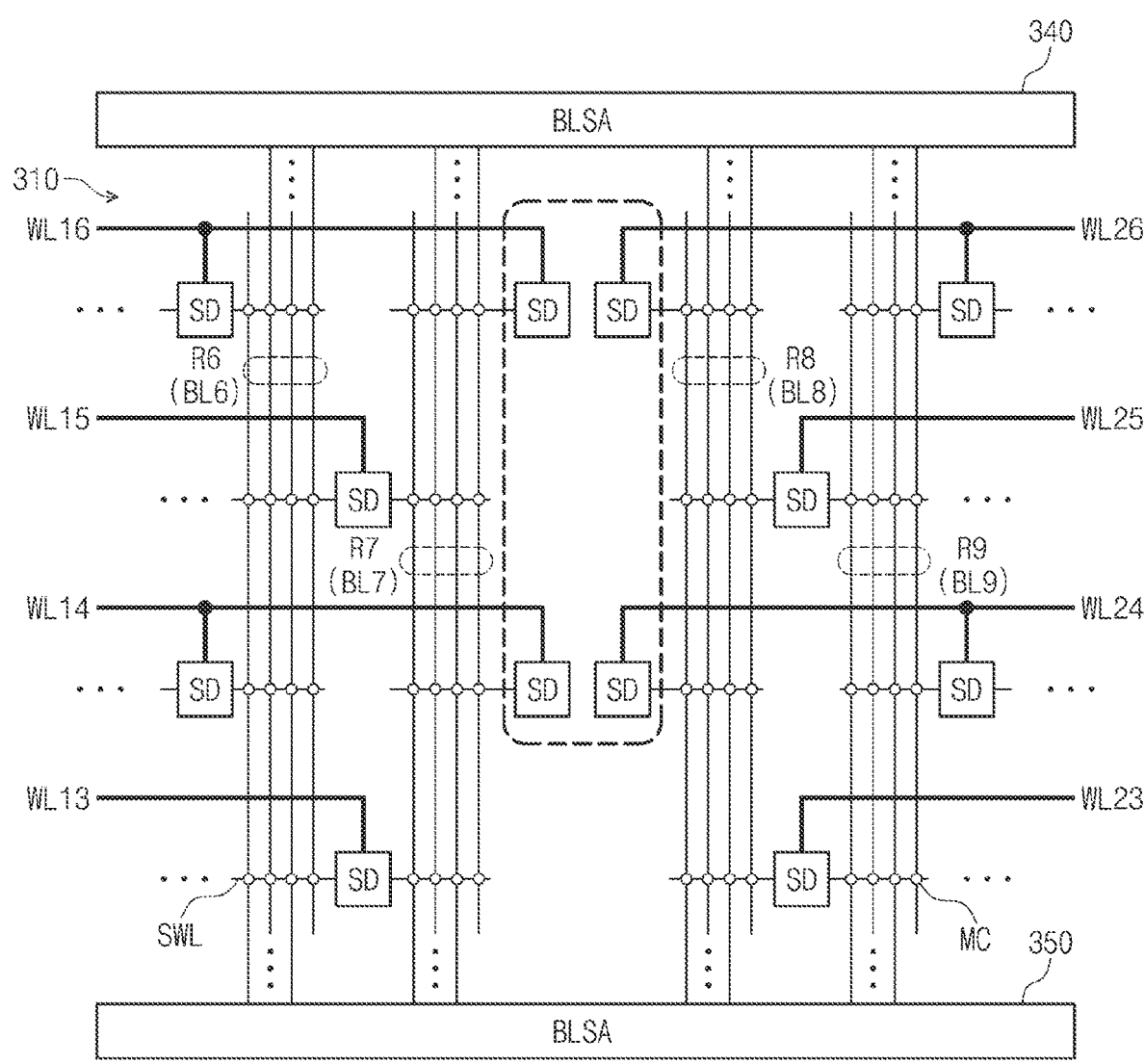
FIG. 6 is a conceptual diagram illustrating an example of the memory cell array of FIG. 5.

FIG. 6 is a conceptual diagram partially illustrating the memory cell array 310 of FIG. 5. Referring to FIGS. 1, 2, 5, and 6, as indicated by the bold dotted line, the 13-th to 16-th word lines WL13 to WL16 and the 23-th to 26-th word lines WL23 to WL26 may be electrically and physically separated between the 7-th region R7 and the 8-th region R8. Accordingly, the sub-word line drivers SD in the 7-th region R7 and the 8-th region R8 are not shared.

The 11-th to 1n-th word lines WL11 to WL1n may pass through a first section including the 0-th to 7-th regions R0 to R7 and may not pass through a second section including the 8-th to 15-th regions R8 to R15. The 21-th to 2n-th word lines WL21 to WL2n may pass through the second section including the 8-th to 15-th regions R8 to R15 and may not pass through the first section including the 0-th to 7-th regions R0 to R7.

As described with reference to FIGS. 3 and 4 and in the context of the structure described in relation to FIGS. 5 and 6, an error of the sub-word line driver SD belonging to the first section including the 0-th to 7-th regions R0 to R7 may not affect the 8-th to 15-th regions R8 to R15 of the second section. Also, an error of the sub-word line driver SD in the 8-th to 15-th regions R8 to R15 may not affect the 0-th to 7-th regions R0 to R7.

In addition, a fault occurring at the 11-th to 1n-th word lines WL11 to WL1n, that is, an error may not affect the 8-th to 15-th regions R8 to R15. A fault occurring at the 21-th to 2n-th word lines WL21 to WL2n, that is, an error may not affect the 0-th to 7-th regions R0 to R7. Accordingly, error-independent coverages may also be provided with regard to a fault of a word line level, as well as a fault of a sub-word line driver level.

Also, a fault of the first row decoder 320 may not affect a fault of the second row decoder 330, and the fault of the second row decoder 330 may not affect the fault of the first row decoder 320. Accordingly, error-independent coverages may be provided with regard to a fault of a row decoder level.

Figure 7:
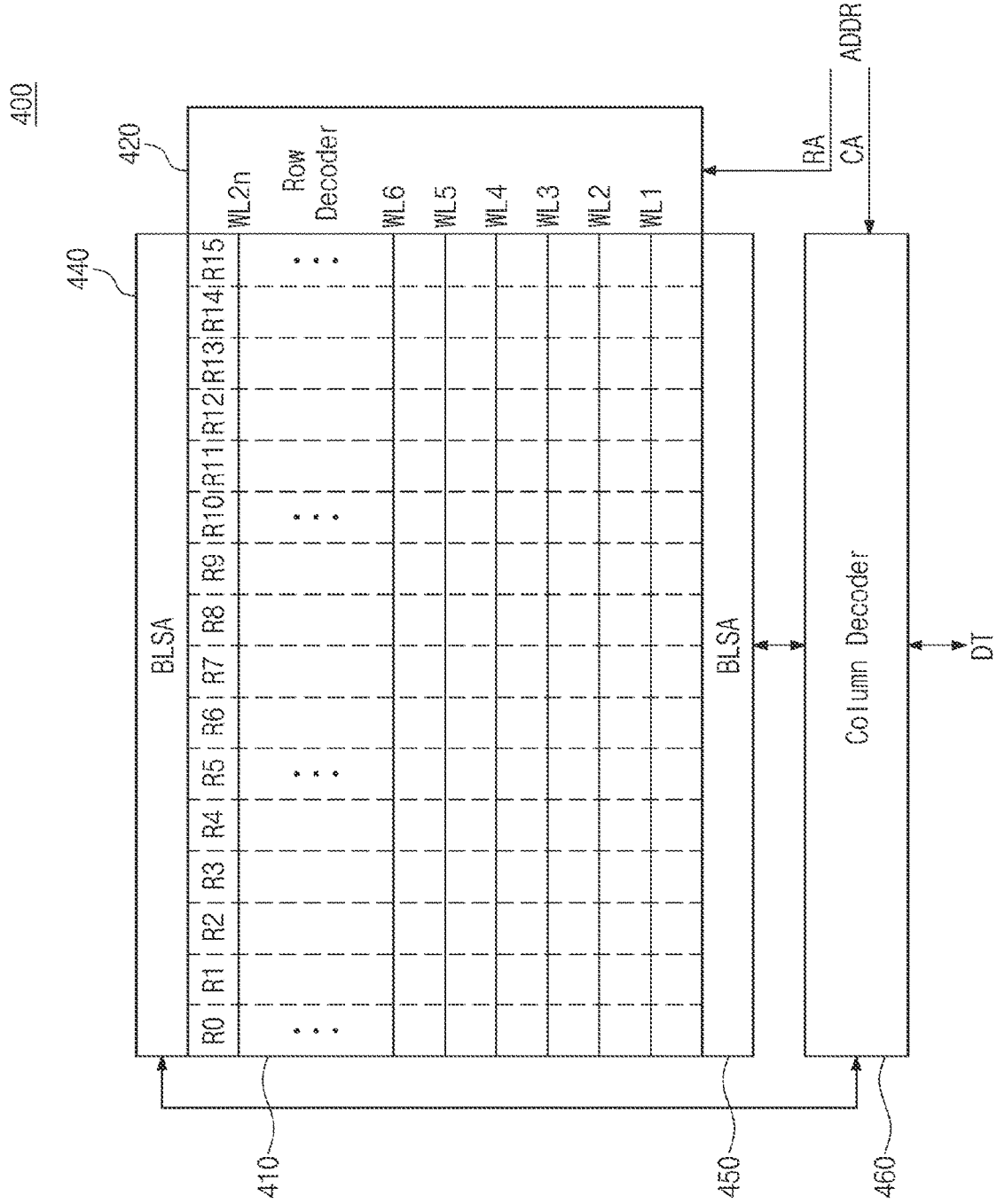
FIG. 7 is a block diagram illustrating another example of a bank having a structure for supporting error-independent coverages or sections independent of each other with regard to a row-dependent error.

FIG. 7 is a block diagram illustrating another example of a bank 400 having a structure that supports error-independent coverage or independent sections, with respect to a row-dependent error. Referring to FIGS. 1, 2, and 7, the bank 400 may include a memory cell array 410, a row decoder 420, a first bit line sense amplifier 440, a second bit line sense amplifier 450, and a column decoder 460.

Here, the structure and operation of the bank 400 may be the same as the bank 200 of FIG. 3, except that the number of word lines WL1 to WL2n connected with the row decoder 420 has been doubled.

Figure 8:
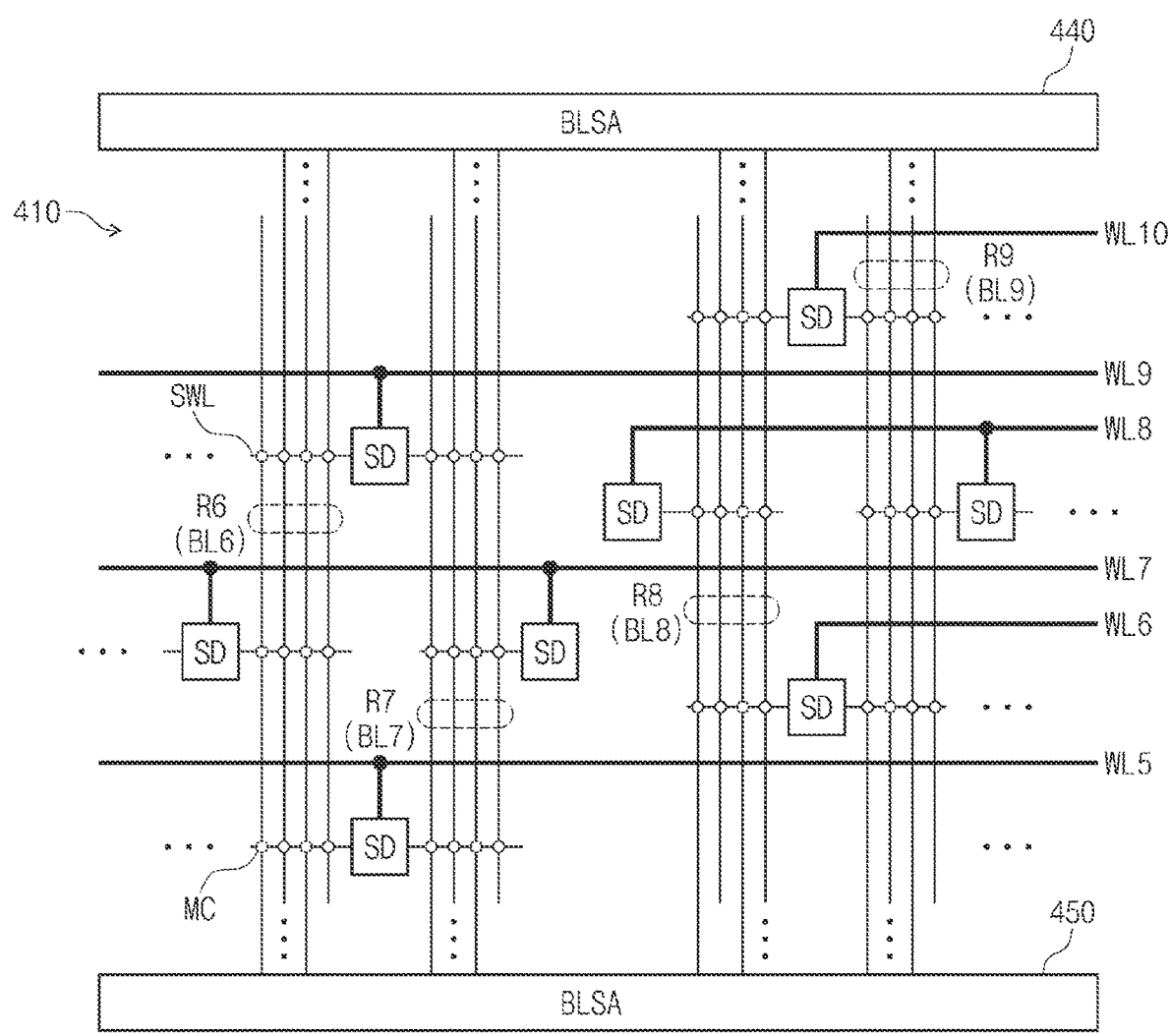
FIG. 8 is a conceptual diagram illustrating a portion of the memory cell array of FIG. 7.

FIG. 8 is a conceptual diagram illustrating an example of the memory cell array 410 of FIG. 7. Referring to FIGS. 1, 2, 7, and 8, the first to 2n-th word lines WL1 to WL2n may be connected, in turn, with memory cells of the first section including the 0-th to 7-th regions R0 to R7 and memory cells of the second section including the 8-th to 15-th regions R8 to R15.

In some embodiments, odd-numbered word lines including the fifth word line WL5, the 7-th word line WL7, and the ninth word line WL9 may be connected with the memory cells of the first section including the 0-th to 7-th regions R0 to R7. Here, the odd-numbered word lines may pass through the second section to reach the first section. Even-numbered word lines including the sixth word line WL6, the 8-th word line WL8, and the tenth word line WL10 may be connected with the memory cells of the second section including the 8-th to 15-th regions R8 to R15.

As described with reference to FIGS. 3 and 4 and in the context of the structure described in relation to FIGS. 7 and 8, an error of the sub-word line driver SD belonging to the first section including the 0-th to 7-th regions R0 to R7 may not affect the 8-th to 15-th regions R8 to R15 of the second section. Also, an error of the sub-word line driver SD belonging to the second section including the 8-th to 15-th regions R8 to R15 may not affect the 0-th to 7-th regions R0 to R7 of the first section.

In addition, a fault occurring at an odd-numbered word line, that is, an error may not affect the 8-th to 15-th regions R8 to R15. A fault occurring at an even-numbered word line, that is, an error may not affect the 0-th to 7-th regions R0 to R7. Accordingly, error-independent coverages may also be provided with regard to a fault of a word line level, as well as a fault of a sub-word line driver level.

FIG. 9 is a conceptual diagram illustrating an example in which a data block corresponding to the data DT provides two or more error-independent coverages. Referring collectively to FIGS. 1 to 9, each of the first to fourth banks BANK1 to BANK4 of the first and second bank groups BG1 and BG2 of the memory device 100 may be implemented as the bank 200 of FIGS. 3 and 4, the bank 300 of FIGS. 5 and 6, or the bank 400 of FIGS. 7 and 8.

The memory device 100 may simultaneously receive or output first to fourth data signals DQ1 to DQ4. The memory device 100 may continuously receive or output the first to fourth data signals DQ1 to DQ4 as much as the number of times corresponding to the number of 0-th to 15-th burst lengths BL0 to BL15, that is, 16. Accordingly, a data block being a unit in which the memory device 100 exchanges the data DT with the external host device 1200 may be formed of 64 bits.

Here, the memory module 1100 is assumed to include the eight (8) first memory devices for data 1121 to 1124 and 1131 to 1134 and the eight (8) second memory devices for data 1127 to 1130 and 1137 to 1140. Accordingly, the memory module 1100 may exchange the data DT with the external host device 1200 in units of 1024 bits.

In this regard, the term "coverage" means a subset of data blocks, each being a unit in which the memory device 100 exchanges the data DT with the external host device 1200. For example, the 0-th to 7-th burst lengths BL0 to BL7 may constitute a first coverage, and the 8-th to 15-th burst lengths BL8 to BL15 may constitute a second coverage, where the first coverage includes first data DT1 and the second coverage includes second data DT2.

An error occurring in the first coverage may not affect the second coverage and may not be affected from the second coverage. An error occurring in the second coverage may not affect the first coverage and may not be affected from the first coverage. Thus, the first coverage and the second coverage may be error-independent coverages. The memory device 100 may provide two or more error-independent coverages with regard to the burst length BL of 16.

That is, an error of the first data DT1 stored in the first coverage may not be associated with an error of the second data DT2 stored in the second coverage. Likewise, an error of the second data DT2 stored in the second coverage may not be associated with an error of the first data DT1 stored in the first coverage.

As described with reference to FIGS. 4, 6, and 8, the 0-th to 15-th regions R0 to R15 respectively corresponding to the 0-th to 15-th burst lengths BL0 to BL15 are arranged in the row direction. Accordingly, two or more error-independent coverages may correspond to two or more sections independent of each other with regard to a row-dependent error. In this regard, the term "section" may mean a subset of the memory cell array 210, and each of the sections may include two or more regions of the 0-th to 15-th regions R0 to R15.

FIG. 10 is a conceptual diagram illustrating a data block corresponding to cyclic redundancy code "C" and parity information "P" providing two or more error-independent coverages. As described with reference to FIG. 9, the 0-th to 7-th burst lengths BL0 to BL7 may constitute the first coverage, and the 8-th to 15-th burst lengths BL8 to BL15 may constitute the second coverage.

Referring collectively to FIGS. 1 to 10, data blocks of the first memory devices for data 1121 to 1124 and 1131 to 1134 may be data blocks for data (e.g., data blocks used to store payload data), and data blocks of the second memory devices for ECC 1125 and 1135 may be data blocks for ECC (e.g., data bocks used to store cyclic redundancy code "C" and parity information "P"). When the data blocks for data provide two or more, error-independent coverages, the external host device 1200 may independently perform error correction encoding/decoding on the two or more coverages.

The error correction encoding may be used to generate the cyclic redundancy code "C" and the parity "P" from the data DT during the write operation. The error correction decoding may be used to detect error(s) in the data DT using the cyclic redundancy code "C" and correcting the detected error using the parity "P" during the read operation.

In some embodiments, the data blocks for ECC may include first cyclic redundancy codes C1 and first parities P1 for the first coverage of the data blocks for data, and second cyclic redundancy codes C2 and second parities P2 for the second coverage of the data blocks for data.

In some embodiments, a data block for ECC corresponding to one of the first memory devices for ECC 1125 and 1135 of the first channel CH1 may include the first cyclic redundancy codes C1 and the second cyclic redundancy codes C2 corresponding to the data blocks for data of the first channel CH1, and a data block for ECC corresponding to the other thereof may include the first parities P1 and the second parities P2 corresponding to the data blocks for data of the first channel CH1.

A data block for ECC corresponding to one of the second memory devices for ECC 1126 and 1136 of the second channel CH2 may include the first cyclic redundancy codes C1 and the second cyclic redundancy codes C2 corresponding to the data blocks for data of the second channel CH2, and a data block for ECC corresponding to the other thereof may include the first parities P1 and the second parities P2 corresponding to the data blocks for data of the second channel CH2.

Figure 11:
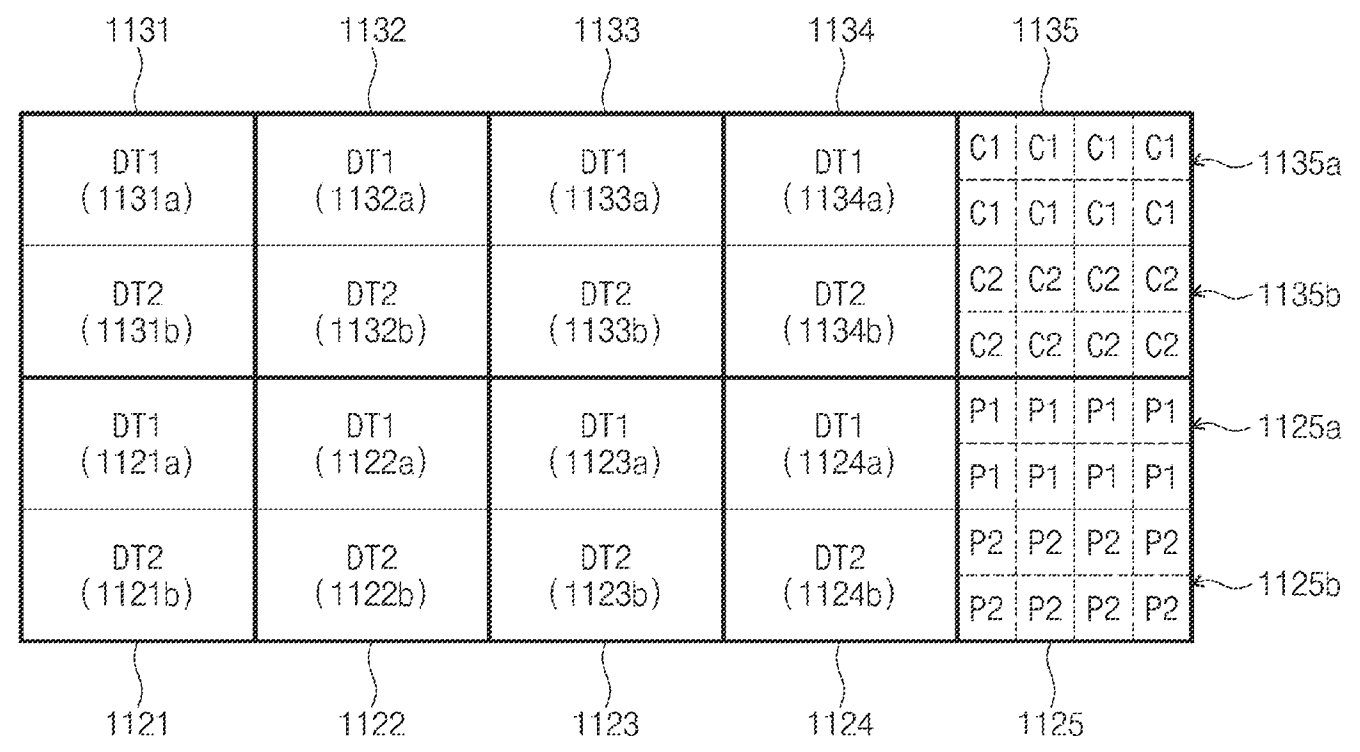

FIG. 11 is a conceptual diagram illustrating another example of data blocks of the first memory devices 1121 to 1125 and 1131 to 1135 of one channel (e.g., the first channel CH1) of the memory module 1100. Data blocks of the second memory devices 1126 to 1130 and 1136 to 1140 of the second channel CH2 may be the same as those described with reference to FIG. 11, except for the respective locations where the data blocks are placed.

Referring collectively to FIGS. 1 to 11, each of data blocks for data belonging to the first memory devices for data 1121 to 1124 and 1131 to 1134 may include the first data DT1 for each of first coverages 1121*a* to 1124*a* and 1131*a* to 1134*a* and the second data DT2 for each of second coverages 1121*b* to 1124*b* and 1131*b* to 1134*b*.

First and second coverages 1125*a* and 1125*b* of a data block for ECC of the first memory device for ECC 1125 may include the first parities P1 and the second parities P2 respectively corresponding to the first data DT1 and the second data DT2 of the first coverages 1121*a* to 1124*a* and 1131*a* to 1134*a* and the second coverages 1121*b* to 1124*b* and 1131*b* to 1134*b* of the data blocks for data.

First and second coverages 1135*a* and 1135*b* of a data block for ECC of the first memory device for ECC 1135 may include the first cyclic redundancy codes C1 and the second cyclic redundancy codes C2 respectively corresponding to the first data DT1 and the second data DT2 of the first coverages 1121*a* to 1124*a* and 1131*a* to 1134*a* and the second coverages 1121*b* to 1124*b* and 1131*b* to 1134*b* of the data blocks for data.

Using the illustrated data blocks, the memory controller 1211 may write data at locations of the first memory devices 1121 to 1125 and 1131 to 1135, which correspond to the address ADDR, or read data from the locations of the first memory devices 1121 to 1125 and 1131 to 1135, which corresponds to the address ADDR.

The first coverages 1121*a* to 1124*a* and 1131*a* to 1134*a* and the second coverages 1121*b* to 1124*b* and 1131*b* to 1134*b* may be error-independent, and thus may be considered as different memories. Accordingly, a range across which the memory controller 1211 performs error correction encoding/decoding may decreased.

Accordingly, when the memory controller 1211 intends to maintain a performance of error correction, the amount of cyclic redundancy code and parity information required may be commensurately decreased. For example, when the amount of data of an error-dependent coverage is equal to the total amount of data of two (2), error-independent coverages, the amount of ECC required to maintain the same error correction performance may be halved in the two coverages.

As illustrated in FIG. 11, the amount of cyclic redundancy code and the amount of parity information may be equally maintained, compared with the example of FIG. 8. Accordingly, the performance of error correction of the memory controller 1211 may be improved. When the memory module 1100 of FIG. 1 is implemented to include general memory devices not supporting error-independent coverages, a RAS (Reliability, Availability, Serviceability) coverage of the memory module 1100 may be single device data correction (SDDC).

That is, as described with reference to FIGS. 1 to 11, in the case where the memory module 1100 includes the first memory devices 1121 to 1125 and 1131 to 1135 and the second memory devices 1126 to 1130 and 1136 to 1140 being error-independent of each other, the RSA coverage for the error-independent coverages of the memory module 1100 may support an error correction function that is more improved than the SDDC.

As a data block is implemented with two error-independent coverages, for example, as memory cells are divided into two sections being independent of each other with regard to the row-dependent error, the error correction capability of the memory module 1100 may be improved. An example of two coverages or two sections is described, but the number of coverages or the number of sections is not limited. As the number of coverages or the number of sections increases, the error correction capability of the memory module 1100 may improve.

An example in which error correction encoding/decoding is performed in units of error-independent coverages is illustrated in FIG. 11. However, even though error-independent coverages are provided, the memory controller 1211 may perform error correction encoding/decoding in units of a data block. That is, data blocks of the first memory devices for ECC 1125 and 1135 may include eight (8) cyclic redundancy "codes" and eight (8) "parities."

Figure 12:
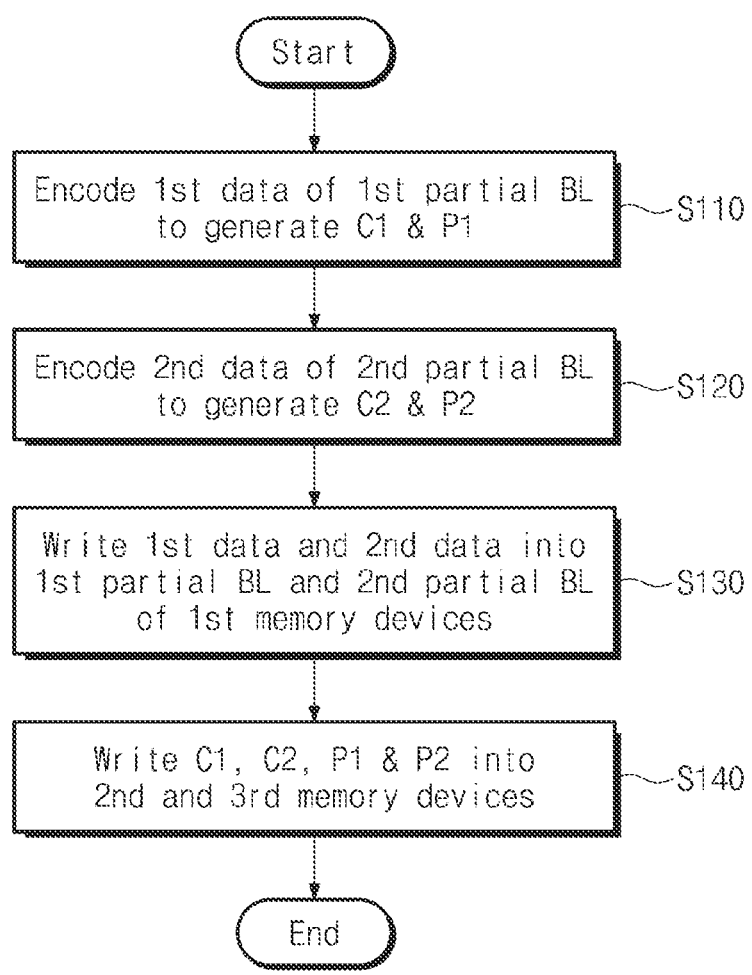
FIG. 12 is a flowchart illustrating in one example a method of operating a computing system according to embodiments of the inventive concept.

FIG. 12 is a flowchart summarizing in one example an operating method for the computing system 1000 of FIG. 1. Referring to FIGS. 1, 11, and 12, the memory controller 1211 may perform the error correction encoding on the first data DT1 corresponding to a first partial (e.g., half) burst length to generate the first cyclic redundancy code C1 and the first parity P1 (S110).

The memory controller 1211 may perform the error correction encoding on the second data DT2 corresponding to a second partial (e.g., half) burst length to generate the second cyclic redundancy code C2 and the second parity P2 (S120).

The memory controller 1211 may write the first data DT1 and the second data DT2 respectively corresponding to the first partial burst length and the second partial burst length into first memory devices, for example, the first memory devices for data 1121 to 1124 and 1131 to 1134 (S130).

The memory controller 1211 may write the first cyclic redundancy code C1, the second cyclic redundancy code C2, the first parity P1, and the second parity P2 into second and third memory devices, for example, the first memory devices for ECC 1125 and 1135.

Here, the foregoing steps may be performed during a write operation during which data is written to the first memory devices 1121 to 1125 and 1131 to 1135 using the first channel CH1. The memory controller 1211 may then perform the same type of write operation on the second memory devices 1126 to 1130 and 1136 to 1140 using the second channel CH2. In this regard, the first and second write operations respectively associated with the first channel CH1 and the second channel CH2 may be simultaneously performed in parallel (e.g., at least partially overlapping in time).

Figure 13:
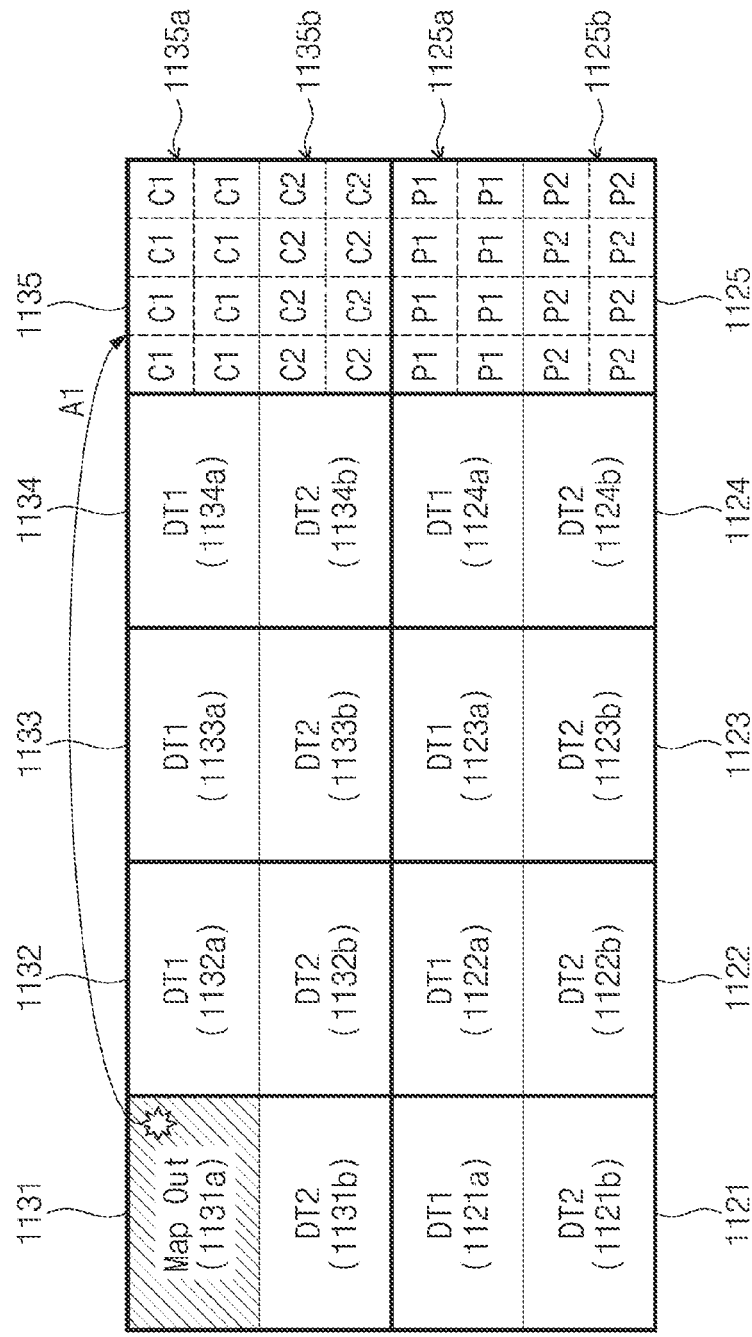
FIG. 13 is a conceptual diagram illustrating an example in which a computing device recovers a memory device at which a fault occurs, when an error occurs in one coverage.

FIG. 13 is a conceptual diagram illustrating an example in which the computing device 1000 of FIG. 1 may perform a recovery operation on (i.e., "recover") a memory device suffering a fault, and assuming that an error has occurred in one coverage. Referring to FIGS. 1 and 13, a fault occurring in one coverage may be termed "a first-type fault." Hence, the example of FIG. 13 may be understood as recovery from a first-type fault.

In some embodiments, a fault may occur in the first coverage 1131*a* of the first memory device 1131 being one of the first memory devices for data 1121 to 1124 and 1131 to 1134. The memory controller 1211 may map out (using e.g., a memory map), the first coverage 1131*a* of the first memory device 1131 wherein the fault occurs.

As indicated by a first arrow A1, the memory controller 1211 may select one of the first memory devices for ECC 1125 and 1135 and may replace the mapped-out coverage with one coverage of the first memory device for ECC 1135 selected.

Figure 14:
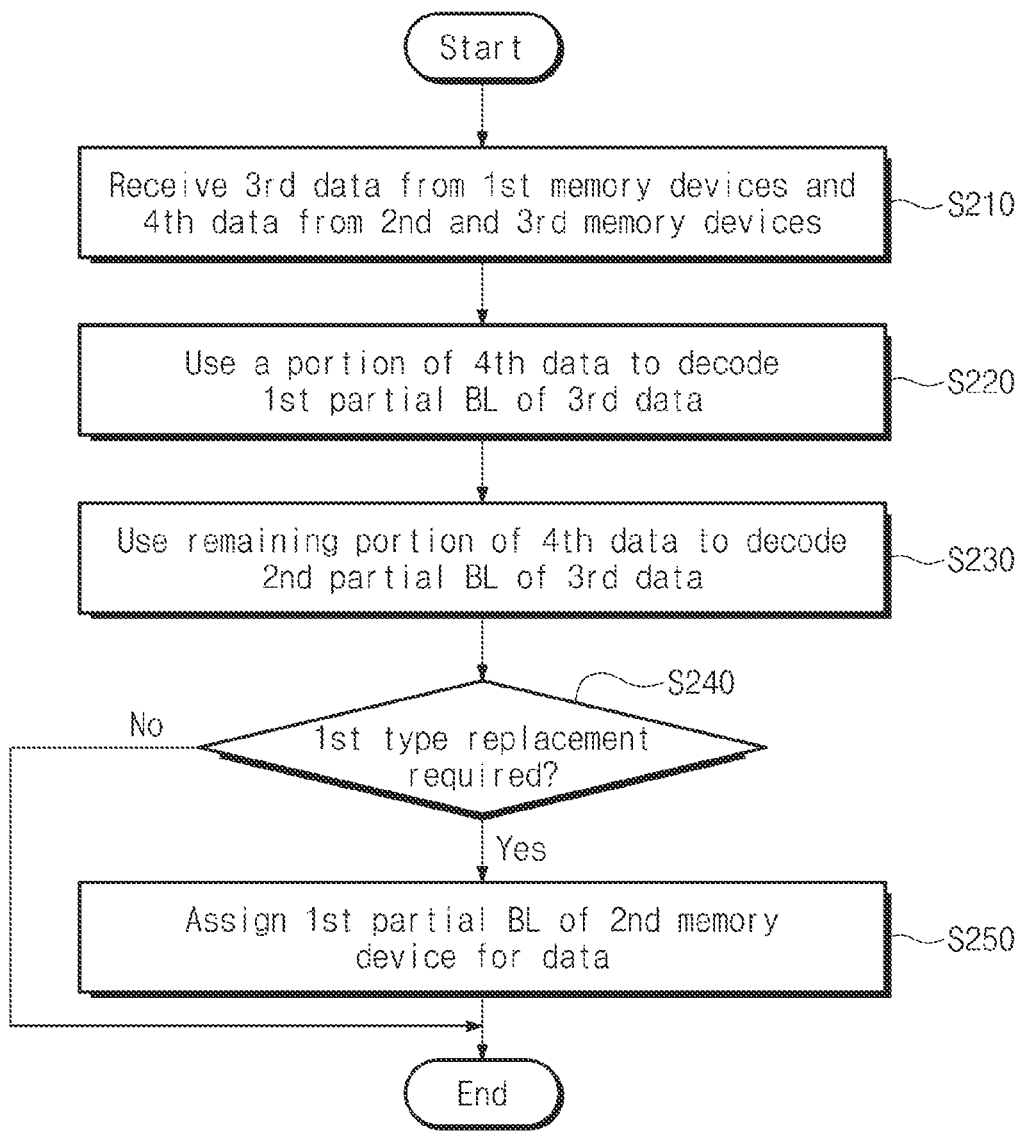
FIG. 14 is a flowchart illustrating in one example a method of operating a computing system according to embodiments of the inventive concept in which the computing system recovers a coverage having a first-type fault firstly occurring with a coverage of a memory device for ECC.

FIG. 14 is a flowchart summarizing in one example a method of recovering a coverage in the computing system 1000 of FIG. 1 following a first-type fault in a memory device for ECC. Referring to FIGS. 1, 13, and 14, the memory controller 1211 may read third data from first memory devices, for example, the first memory devices for data 1121 to 1124 and 1131 to 1134 and may read fourth data from second and third memory devices, for example, the first memory devices for ECC 1125 and 1135 (S210).

The memory controller 1211 may perform error correction decoding of data (e.g., the first data DT1) corresponding to a first partial (e.g., half) burst length from among the third data using a portion of the fourth data, for example, the first cyclic redundancy code C1 and the first parity P1 (S220).

The memory controller 1211 may perform error correction decoding of data (e.g., the second data DT2) corresponding to a second partial (e.g., half) burst length from among the third data using the remaining portion of the fourth data, for example, the second cyclic redundancy code C2 and the second parity P2 (S230).

The memory controller 1211 may determine whether first-type replacement is required. The first-type replacement may be to replace a coverage of one data block for data with a coverage of one data block for ECC (S240).

In some embodiments, in a case where an error repeatedly occurs in a coverage of a data block for data corresponding to a specific location when reading data blocks from the memory module 1100 using a specific address ADDR, it may be determined that a fault is present in a memory device corresponding to the specific address ADDR and corresponding to the coverage where the error occurs. When it is determined that a fault is present in one coverage, it may be determined that the first-type replacement is required.

When it is determined that the first-type replacement is not required (S240=NO), the process ends. However, when it is determined that the first-type replacement is required (S240=YES), the memory controller 1211 may assign a coverage, which corresponds to a first partial burst length of the second memory device, for example, a first memory device for ECC selected from the first memory devices for ECC 1125 and 1135, for data (S250).

Figure 15:
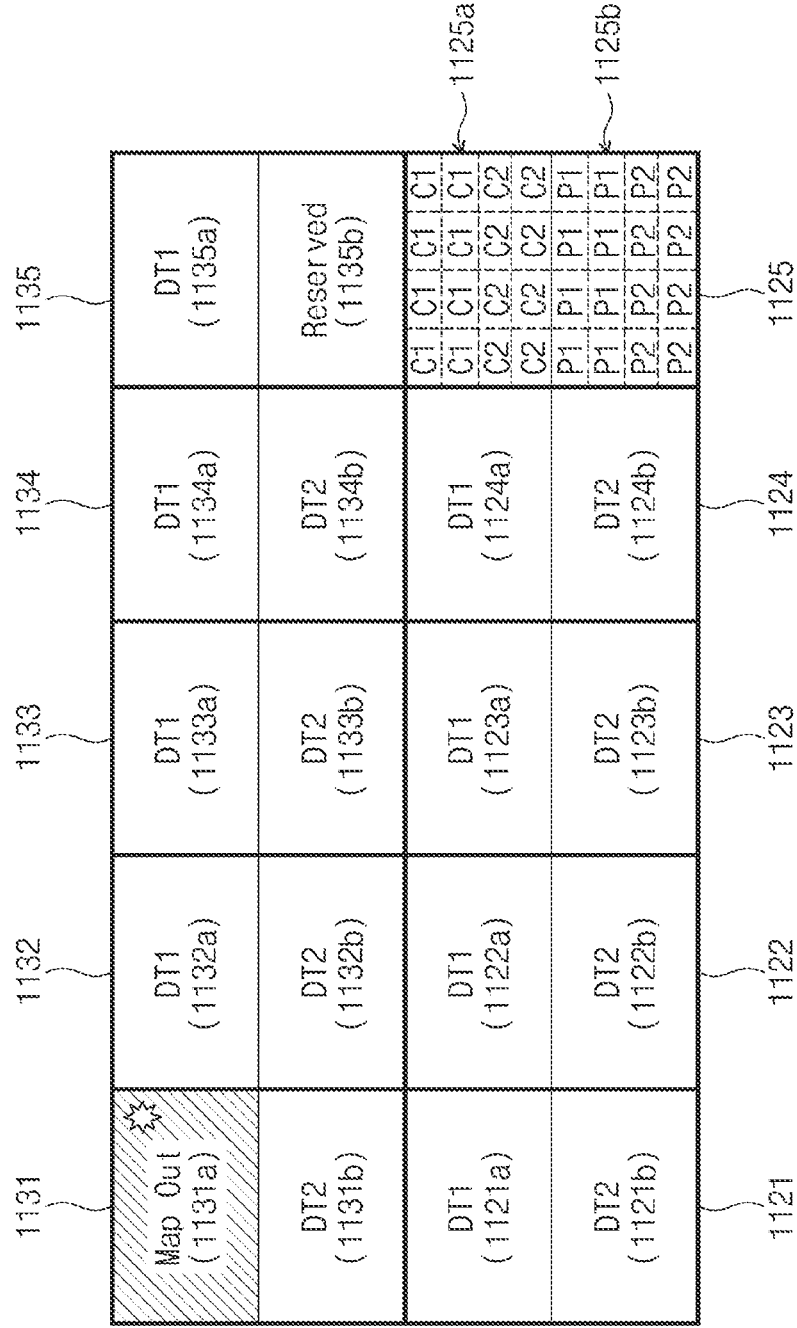
FIG. 15 is a conceptual diagram illustrating an example in which first-type replacement is first performed.

FIG. 15 is a conceptual diagram illustrating an example in which a first-type replacement is first performed. Referring to FIGS. 1, 13, and 15, when the memory controller 1211 accesses the first memory devices 1121 to 1125 and 1131 to 1135 based on the address ADDR where a fault is recognized, the memory controller 1211 may access the memory module 1100 through data blocks illustrated in FIG. 15.

The first coverage 1135a of a data block of the first memory device for ECC 1135 selected may instead transfer the first data DT1 to be written in the memory module 1100 through the mapped-out coverage 1131a. That is, the first data DT1 may be written into a portion corresponding to a first partial burst length (e.g., a first half of the burst length) of a storage space corresponding to the address ADDR and belonging to the selected first memory device for ECC 1135.

The second coverage 1135b of the data block of the selected first memory device for ECC 1135 may be left in a reserved state. That is, data may not be written into a portion corresponding to a second partial burst length (e.g., a second half of the burst length) of the storage space corresponding to the address ADDR and belonging to the selected first memory device for ECC 1135.

The first coverage 1125a of the data block of the unselected first memory device for ECC 1125 may include the first cyclic redundancy codes C1 and the second cyclic redundancy codes C2. The second coverage 1125b of the data block of the unselected first memory device for ECC 1125 may include the first parities P1 and the second parities P2.

The first cyclic redundancy codes C1, the second cyclic redundancy codes C2, the first parities P1, and the second parities P2 may be written to a storage space corresponding to the address ADDR and belonging to the unselected first memory device for ECC 1135.

Compared to the data blocks of FIG. 14, the first cyclic redundancy codes C1, the second cyclic redundancy codes C2, the first parities P1, and the second parities P2 of FIG. 15 may be halved in amount. As described above, because the amount of ECC supporting the RAS coverage is halved based on error-independent coverages, data blocks corresponding to the address ADDR after replacement may support the RAS coverage of the SDDC with respect to error-independent coverages.

Figure 16:
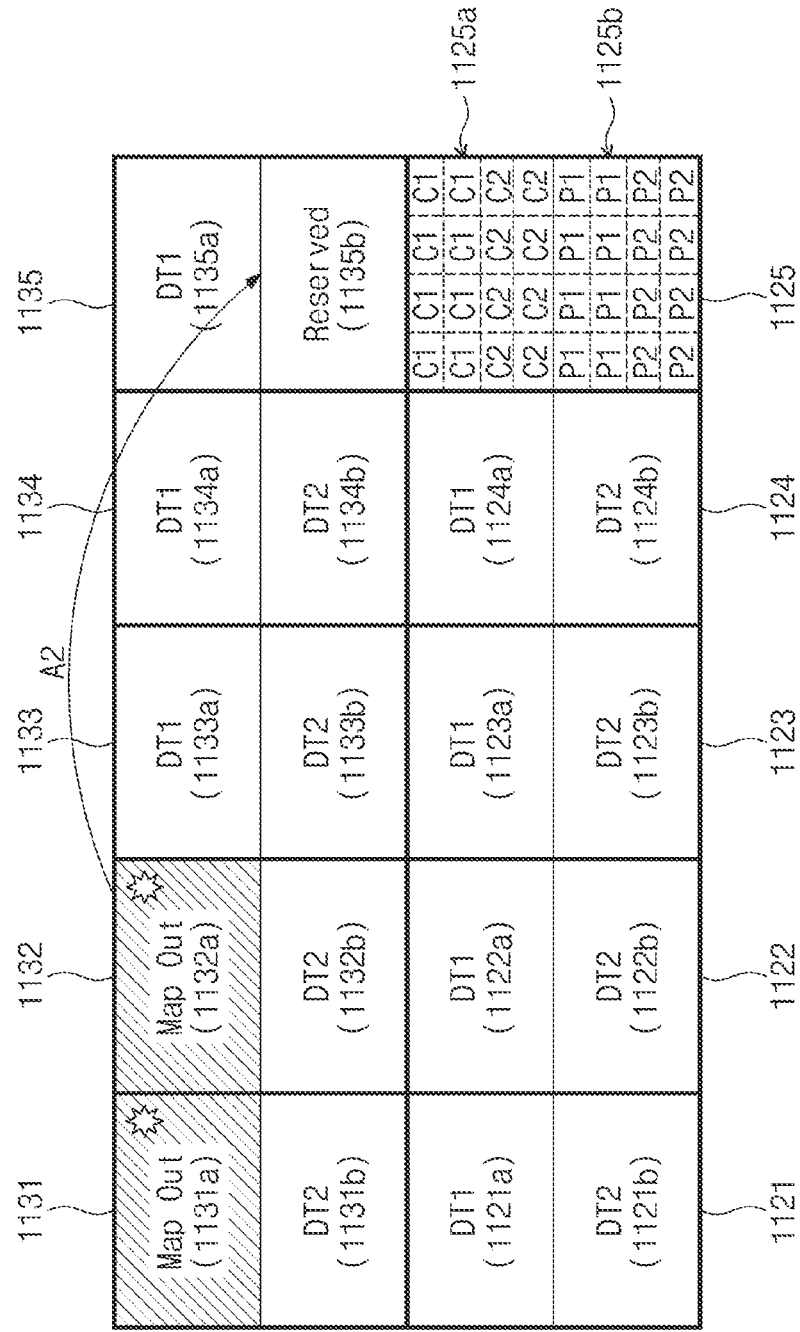
FIG. 16 is a conceptual diagram illustrating an example of recovering a memory device where first-type fault secondly occurs.

FIG. 16 is a conceptual diagram illustrating an example of recovering a memory device where the first-type fault secondly occurs. Referring to FIGS. 1, 15, and 16, a fault may occur in the first coverage 1132a of the first memory device 1132 being another of the first memory devices for data 1121 to 1124 and 1131 to 1134. The memory controller 1211 may map out, from the memory map, the first coverage 1132a of the first memory device 1132 where the fault occurs.

As indicated by a second arrow A2, the memory controller 1211 may replace the mapped-out coverage with the reserved coverage of the first memory device for ECC 1135 including the reserved coverage.

Figure 17:
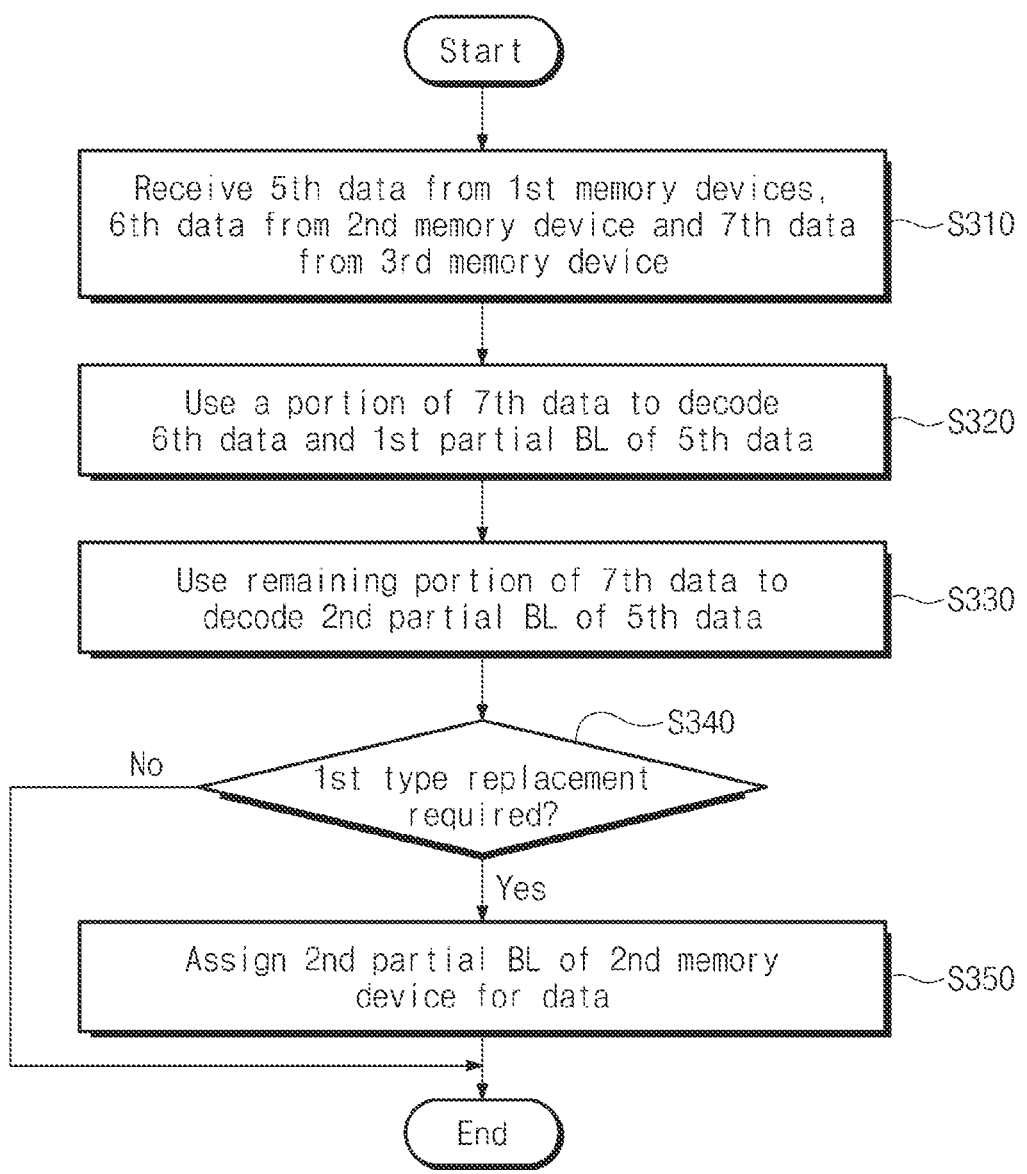
FIG. 17 is a flowchart illustrating in one example a method of operating a computing system according to embodiments of the inventive concept in which the computing system recovers a coverage having a first-type fault secondly occurring with a coverage of a memory device for ECC.

FIG. 17 is a flowchart summarizing in one example a recovery method for the computing system 1000 of FIG. 1, wherein a coverage having a first-type fault secondly occurring with a coverage of a memory device for ECC. Referring to FIGS. 1, 16, and 17, the memory controller 1211 may read 5-th data from first memory devices (e.g., the first memory devices for data 1121 to 1124 and 1131 to 1134), read 6-th data from a second memory device (e.g., the selected first memory device for ECC 1135), and read 7-th data from a third memory device (e.g., an unselected first memory device for ECC 1125 (S310).

The memory controller 1211 may perform error correction decoding of data corresponding to a first partial burst length from among the 5-th data and the 6-th data using a portion of the 7-th data (e.g., the first cyclic redundancy code C1 and the first parity P1) (S320). For example, the memory controller 1211 may perform error correction decoding of the first data DT1 using the first cyclic redundancy code C1 and the first parity P1.

The memory controller 1211 may then perform error correction decoding of data corresponding to a second partial burst length from among the 5-th data using the remaining portion of the 7-th data (e.g., the second cyclic redundancy code C2 and the second parity P2) (S330). For example, the memory controller 1211 may perform error correction decoding of the second data DT2 using the second cyclic redundancy code C2 and the second parity P2.

The memory controller 1211 may determine whether first-type replacement is required (S340). In a case where an error repeatedly occurs in a coverage of a data block for data corresponding to a specific location when reading data blocks from the memory module 1100 using a specific address ADDR, it may be determined that a fault is present in a memory device corresponding to the specific address ADDR and corresponding to the coverage where the error occurs. When it is determined that a fault is present in one coverage, it may be determined that the first-type replacement is required.

When it is determined that the first-type replacement is not required (S340=NO), the process ends. However, when it is determined that the first-type replacement is required (S340=YES), the memory controller 1211 may assign a coverage of the second memory device for data (e.g., a second memory device for ECC selected) corresponding to a second partial burst length (S350).

Figure 18:
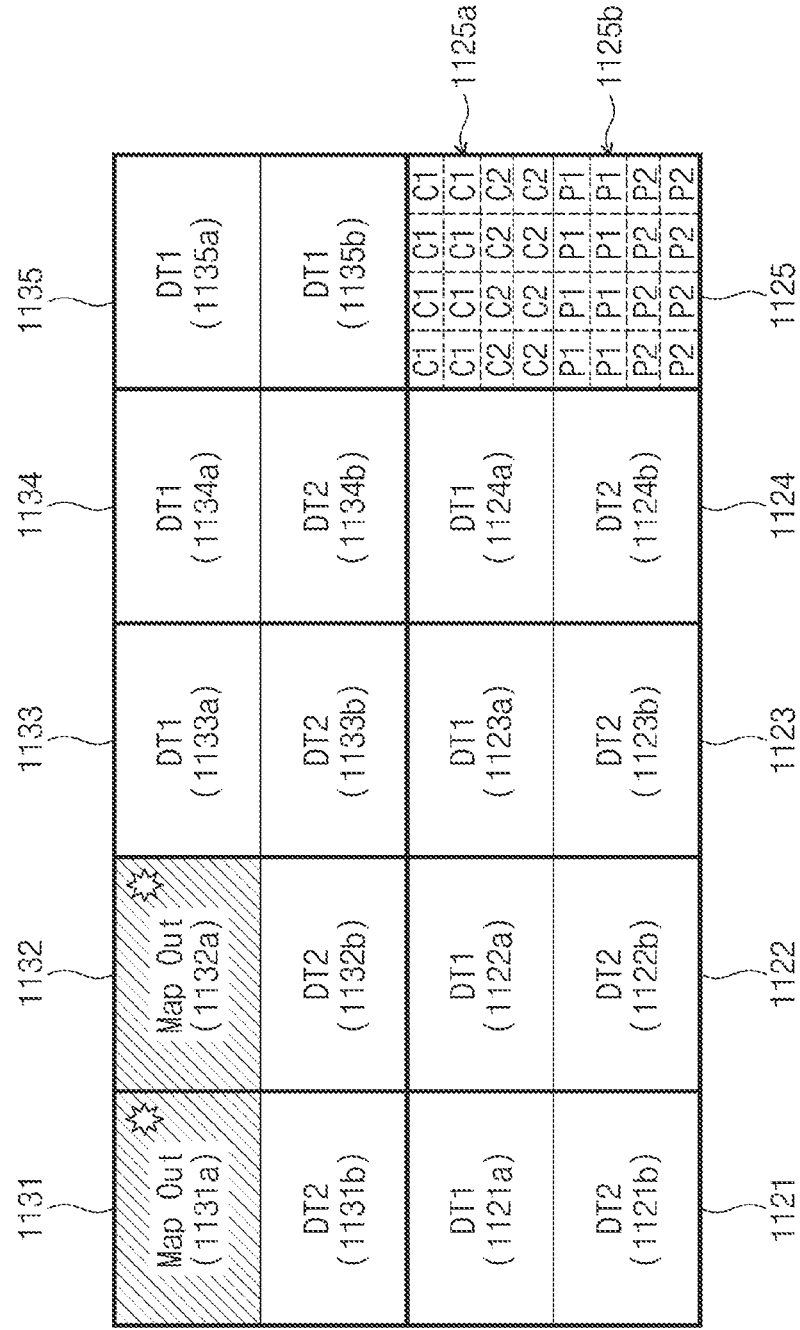
FIG. 18 is a conceptual diagram illustrating an example in which first-type replacement is secondly performed.

FIG. 18 is a conceptual diagram illustrating an example in which the first-type replacement is secondly performed. Referring to FIGS. 1, 16, and 18, when the memory controller 1211 accesses the first memory devices 1121 to 1125 and 1131 to 1135 based on the address ADDR where a fault is recognized, the memory controller 1211 may access the memory module 1100 through data blocks illustrated in FIG. 18.

The first coverage 1135b of the data block of the first memory device for ECC 1135 selected may instead transfer the first data DT1 to be written into the memory module 1100 through the mapped-out coverage 1132a. That is, the first data DT1 may be written to (e.g., a portion corresponding to a second partial burst length) of a storage space corresponding to the address ADDR and belonging to the selected first memory device for ECC 1135.

The first coverage 1125a of the data block of the unselected first memory device for ECC 1125 may include the first cyclic redundancy codes C1 and the second cyclic redundancy codes C2. The second coverage 1125b of the data block of the unselected first memory device for ECC 1125 may include the first parities P1 and the second parities P2.

As described with reference to FIG. 15, data blocks corresponding to the address ADDR, after replacement, may support the RAS coverage of the SDDC with respect to error-independent coverages.

As described with reference to FIGS. 13 to 15, when the first-type fault first occurs in a storage space corresponding to a specific address ADDR, the memory module 1100 may support the RAS coverage of the SDDC based on error-independent coverages and may support recovery.

As described with reference to FIGS. 16 to 18, when the first-type fault secondly occurs in the storage space corresponding to the specific address ADDR, the memory module 1100 may support the RAS coverage of the SDDC based on error-independent coverages and may support recovery.

Afterwards, even though the first-type fault thirdly occurs in the storage space corresponding to the specific address ADDR, the memory module 1100 may support the RAS coverage of the SDDC based on error-independent coverages and may support error correction.

In relation to the embodiments described with reference to FIGS. 13 to 18, examples in which fault detection, replacement and recovery, and error correction are performed have been described with reference to the data blocks of the first memory devices 1121 to 1125 and 1131 to 1135 of the first channel CH1. However, this description may equally be applied to the embodiments of FIGS. 13 to 18 and the second memory devices 1126 to 1130 and 1136 to 1140 of the second channel CH2.

Figure 19:
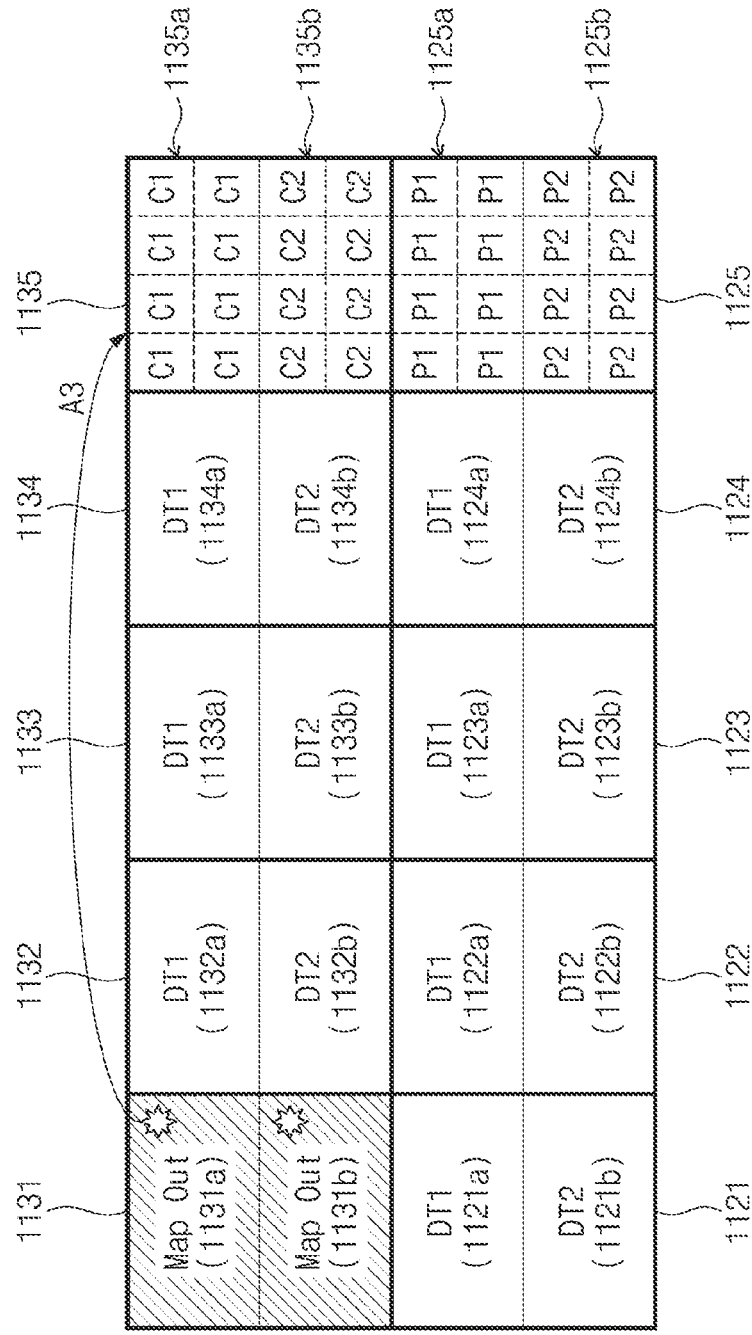
FIG. 19 is a conceptual diagram illustrating another example in which a computing device recovers a memory device at which a fault occurs, when an error occurs in a data block.

FIG. 19 is a conceptual diagram illustrating another example in which the computing device of FIG. 1 recovers a memory device at which a fault occurs, when an error occurs in a data block. Referring to FIGS. 1 and 19, a fault occurring in one data block may be a second-type fault. The example illustrated in FIG. 19 shows the second-type fault first occurring.

That is, a fault may occur in a data block of the first memory device 1131 being one of the first memory devices for data 1121 to 1124 and 1131 to 1134. The memory controller 1211 may map out, from the memory map, the data block of the first memory device 1131 where the fault occurs.

As indicated by a third arrow A3, the memory controller 1211 may select one of the first memory devices for ECC 1125 and 1135, and a data block of the first memory device for ECC 1135 selected may replace the mapped-out data block.

Figure 20:
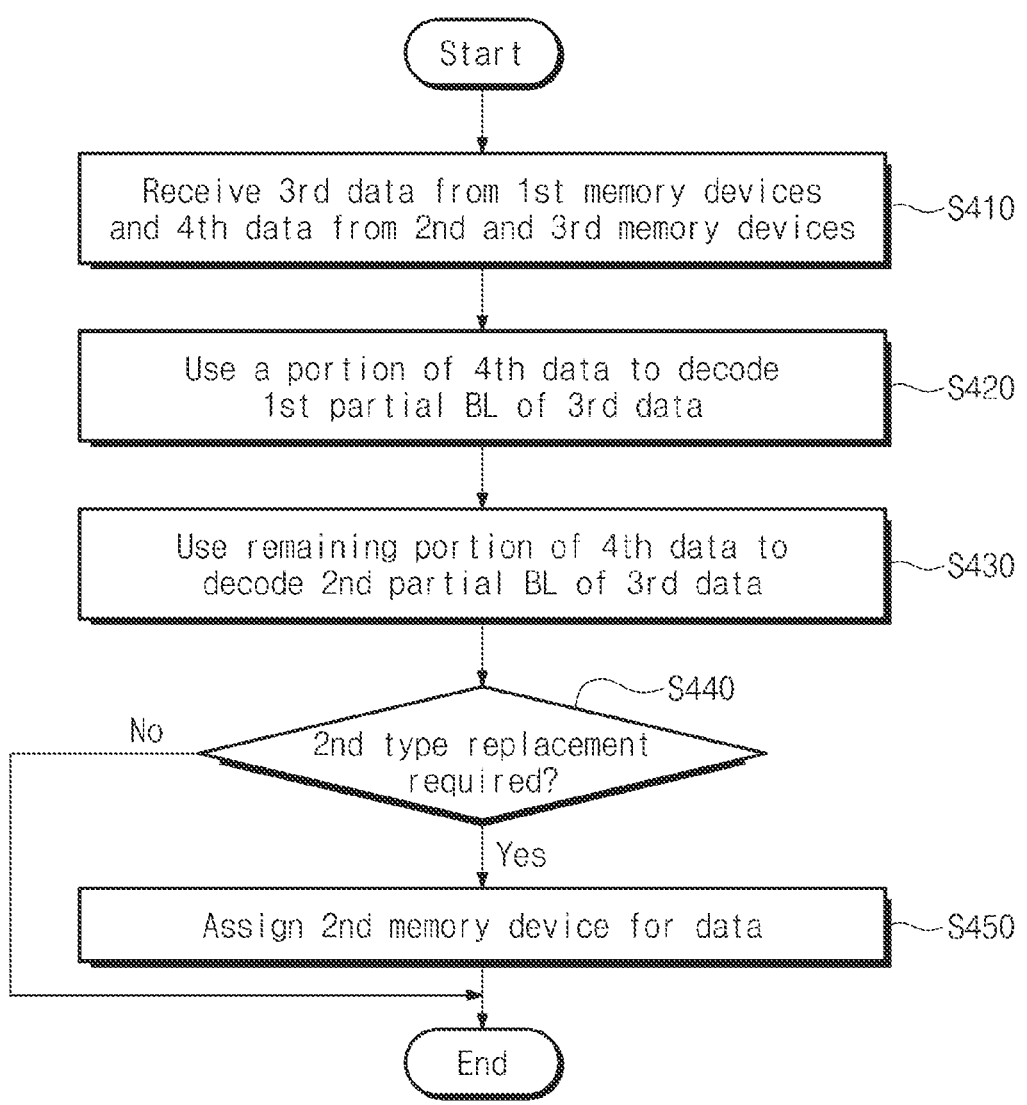
FIG. 20 is a flowchart illustrating in one example a method of operating a computing system according to embodiments of the inventive concept in which the computing system recovers a coverage having a second-type fault with a coverage of a memory device for ECC.

FIG. 20 is a flowchart illustrating in one example a method of recovering in the computing system 1000 of FIG. 1 a coverage having a second-type fault with a coverage of a memory device for ECC. Referring to FIGS. 1, 19, and 20, the memory controller 1211 may read third data from first memory devices (e.g., the first memory devices for data 1121 to 1124 and 1131 to 1134) and read fourth data from second and third memory devices (e.g., the first memory devices for ECC 1125 and 1135) (S410).

The memory controller 1211 may perform error correction decoding of data (e.g., the first data DT1) corresponding to a first partial burst length from among the third data using a portion of the fourth data (e.g., the first cyclic redundancy code C1 and the first parity P1) (S420).

The memory controller 1211 may perform error correction decoding of data (e.g., the second data DT2) corresponding to a second partial burst length from among the third data using the remaining portion of the fourth data (e.g., the second cyclic redundancy code C2 and the second parity P2) (S430).

The memory controller 1211 may then determine whether second-type replacement is required (S440). The second-type replacement may be to replace one data block for data with one data block for ECC.

In a case where an error repeatedly occurs in a data block for data corresponding to a specific location when reading data blocks from the memory module 1100 using a specific address ADDR, it may be determined that a fault is present in a memory device corresponding to the specific address ADDR and corresponding to the data block where the error occurs. When it is determined that a fault is present in one data block, it may be determined that the second-type replacement is required.

When it is determined that the second-type replacement is not required (S440=NO), the process ends. However, when it is determined that the second-type replacement is required (S440=YES), the memory controller 1211 may assign a second memory device (e.g., a first memory device for ECC selected from the first memory devices for ECC 1125 and 1135 for data) (S450).

Figure 21:
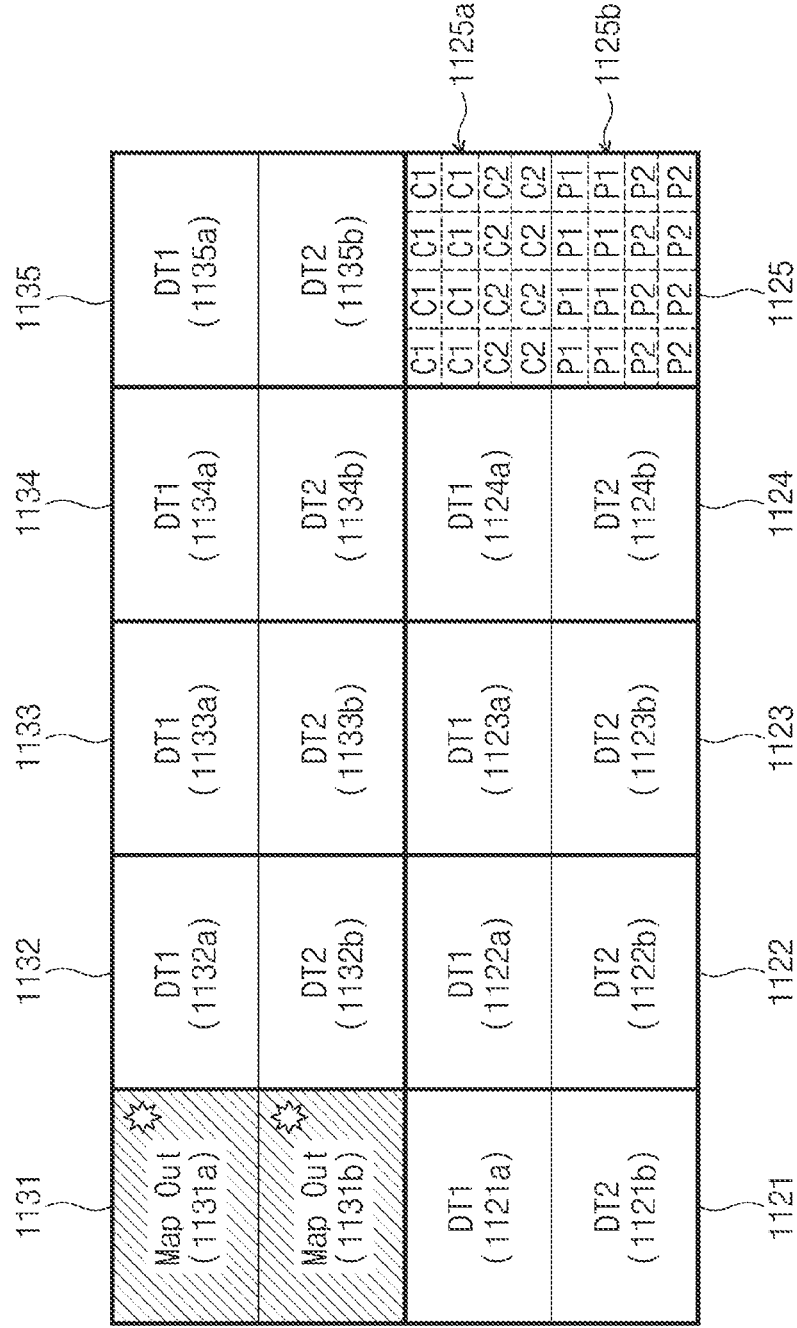
FIG. 21 is a conceptual diagram illustrating an example in which second-type replacement is performed.

FIG. 21 is a conceptual diagram illustrating an example in which the second-type replacement is performed. Referring to FIGS. 1, 19, and 21, when the memory controller 1211 accesses the first memory devices 1121 to 1125 and 1131 to 1135 based on the address ADDR where a fault is recognized, the memory controller 1211 may access the memory module 1100 through data blocks illustrated in FIG. 21.

A data block of the first memory device for ECC 1135 selected may instead transfer the first data DT1 and the second data DT2 to be written into the memory module 1100 through a data block of the first memory device 1131 mapped out. That is, the first data DT1 and the second data DT2 may be written into a storage space corresponding to the address ADDR and belonging to the selected first memory device for ECC 1135.

The first coverage 1125a of the data block of the first memory device for ECC 1125 not selected may include the first cyclic redundancy codes C1 and the second cyclic redundancy codes C2. The second coverage 1125b of the data block of the unselected first memory device for ECC 1125 may include the first parities P1 and the second parities P2.

The first cyclic redundancy codes C1, the second cyclic redundancy codes C2, the first parities P1, and the second parities P2 may be written into a storage space corresponding to the address ADDR and belonging to the unselected first memory device for ECC 1125.

As described with reference to FIGS. 15 and 18, data blocks corresponding to the address ADDR after replacement may support the RAS coverage of the SDDC with respect to error-independent coverages.

In the embodiments described in relation to FIGS. 19 to 21, examples in which fault detection, replacement and recovery, and error correction are performed are described with reference to the data blocks of the first memory devices 1121 to 1125 and 1131 to 1135 of the first channel CH1. However, this description may be equally applied to the second memory devices 1126 to 1130 and 1136 to 1140 of the second channel CH2.

Figure 22:
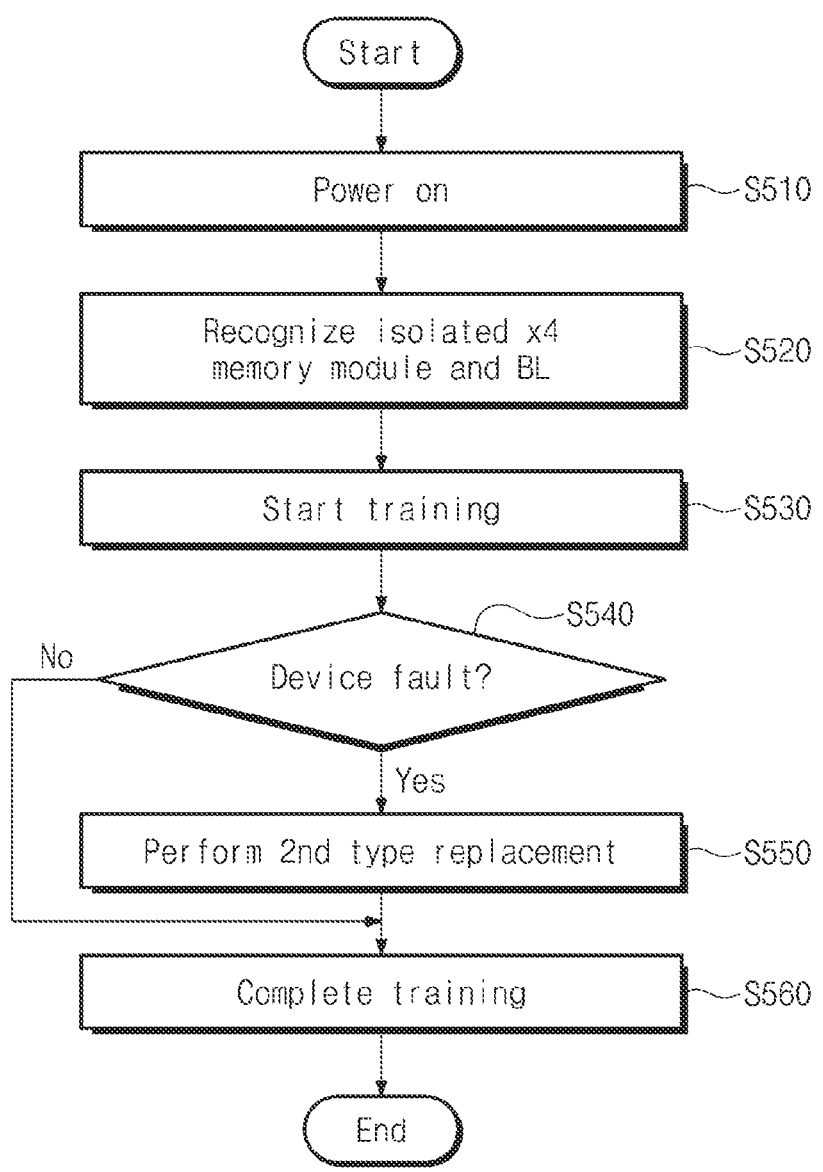
FIG. 22 is a flowchart illustrating in one example a method of operating a computing system according to embodiments of the inventive concept in which the computing system performs training of a memory module.

FIG. 22 is a flowchart summarizing in one example a method of performing training of the memory module 110 in the computing system 1000 of FIG. 1. Referring to FIGS. 1 and 22, upon the computing system 1000 being powered on (S510), the memory controller 1211 may recognize an isolated x4 memory module and the burst length BL (S520). For example, the memory controller 1211 may receive information from serial presence detect (SPD) of the memory module 1100 and may recognize the isolated x4 memory module and the burst length BL.

The isolated x4 memory module may be a memory module that supports two or more error-independent coverages with respect to the burst length BL as described with reference to FIGS. 3 to 8 (e.g., coverages error-independent of each other with regard to a row-dependent error) and is based on memory devices receiving or outputting the data DT or the ECC through 4 data signals (x4).

The memory controller 1211 may then start training (S530). Here, the training may include calibrating transmission timings and reception timings of the data signals DQ and the data strobe signals DQS.

The memory controller 1211 may determine whether a device fault is detected (S540). For example, when the training of at least one of the first and second memory devices 1121 to 1140 fails, the device fault may be detected.

When a device fault is detected (S540=YES), the memory controller 1211 may perform the second-type replacement (S550). For example, as described with reference to FIGS. 19 to 21, the memory controller 1211 may map out the whole memory device being faulty. The memory controller 1211 may replace all data blocks of the faulty memory device with data blocks of one of memory devices for ECC.

However, when a device fault is not detected (S540=NO), the memory controller 1211 may complete the training (S560). In an embodiment, the map-out and the replacement may be performed to be distinguishable from each other. For example, the map-out may be performed during the training. The replacement may be performed after the training is completed.

As described above, the memory module 1100 according to an embodiment of the inventive concept may support recovery of a device fault due to a training failure.

FIG. 23 is a conceptual diagram illustrating an example of storage spaces for the first memory devices 1121 to 1125 and 1131 to 1135. Referring to FIGS. 1 and 23, each of the storage spaces of the first memory devices 1121 to 1125 and 1131 to 1135 may correspond to a plurality of data blocks. In FIG. 23, the storage spaces of the first memory devices 1121 to 1125 and 1131 to 1135 are marked by squares of a bold line, and data blocks corresponding to the burst length BL and the data signals DQ are marked by squares of a thin line.

Each of the data blocks may be implemented with two or more coverages being error-independent of each other as marked by a thin dotted line. The memory controller 1211 may access the storage spaces of the first memory devices 1121 to 1125 and 1131 to 1135 in units of a data block. In some embodiments, data blocks that are accessed when the memory controller 1211 once accesses (e.g., writes or reads) the storage spaces of the first memory devices 1121 to 1125 and 1131 to 1135 are marked by a bold dotted line. The data blocks marked by the bold dotted line may correspond to the data blocks illustrated in FIG. 11.

In each of the storage spaces of the first memory devices 1121 to 1125 and 1131 to 1135, replacement may be performed in units of a data block. For example, a first storage space of storage spaces of the first memory device 1121 may be normal, and a second storage space thereof may have a fault. When the memory controller 1211 accesses the first storage space of the first memory device 1121, a data block of the first memory device 1121 may include the first data DT1 and the second data DT2 as illustrated in FIG. 11.

When the memory controller 1211 accesses the second storage space of the first memory device 1121, one of coverages of the data block of the first memory device 1121 or the data block may be replaced as described with reference to FIG. 15 or 21.

The embodiment described with reference to FIG. 23 may be equally applied to the second memory devices 1126 to 1130 and 1136 to 1140 of the second channel CH2.

In the above embodiments, there are described locations of a data block, at which the cyclic redundancy code "C" and the parity "P" are mounted. However, locations of the cyclic redundancy code "C" and the parity "P" are not limited to the above examples. An order or a shape in which the cyclic redundancy code "C" and the parity "P" are mounted in a data block may be determined randomly based on a demand of the external host device 1200.

In the above embodiments, components according to the inventive concept are described using the terms "first", "second", "third", and the like. However, the terms "first", "second", "third", and the like may be used to distinguish components from each other and do not limit the inventive concept. For example, the terms "first", "second", "third", and the like do not involve an order or a numerical meaning of any form.

In the above embodiments, components according to embodiments of the inventive concept are described using blocks. The blocks may be implemented with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit or circuits enrolled as intellectual property (IP)

According to the inventive concept, a memory device of a semiconductor memory module may include two or more coverages that are accessed in units of a data block and are error-independent of each other. A method for accessing the semiconductor memory module supporting an improved error correction function is provided using a data block for ECC as a backup space of a data block for data.

While the inventive concept has been described with reference to certain embodiments thereof, it will be apparent to those of ordinary skill in the art that various changes and modifications may be made thereto without departing from the scope of the inventive concept as set forth in the following claims.

What is claimed is:

1. A method for accessing a memory module including first memory devices, a second memory device and a third memory device, the method comprising:

encoding first data of a first partial burst length to generate first parities and first cyclic redundancy codes;

encoding second data of a second partial burst length to generate second parities and second cyclic redundancy codes;

writing the first data and the second data to the first memory devices; and writing the first parities, the first cyclic redundancy codes, the second parities, and the second cyclic redundancy codes to the second memory device and the third memory device, wherein the first partial burst length and the second partial burst length form a burst length, and wherein each of the first memory devices, the second memory device, and the third memory device includes two or more error-independent coverages corresponding to the first partial burst length and the second partial burst length with respect to the burst length.

2. The method of claim 1, wherein the burst length is 16.

3. The method of claim 2, wherein the first partial burst length is 8, and the second partial burst length is 8.

4. The method of claim 1, further comprising:
receiving third data corresponding to the burst length from the first memory devices;
receiving fourth data corresponding to the burst length from the second memory device and the third memory device;
decoding a portion of the third data corresponding to the first partial burst length using a portion of the fourth data; and
decoding a remaining portion of the third data corresponding to the second partial burst length using a remaining portion of the fourth data.

5. The method of claim 4, further comprising:
assigning a first region of the second memory device corresponding to the first partial burst length in response to a determination that a first-type replacement is required.

6. The method of claim 5, wherein the determination that the first-type replacement is required is made when an error is detected in a first memory device among the first memory devices associated with decoding of the portion of the third data and decoding of the remaining portion of the third data, and the error is detected at a same location of the first memory device a number of times.

7. The method of claim 5, further comprising:
encoding fifth data of the first partial burst length to generate third parities and third cyclic redundancy codes;
encoding sixth data of the second partial burst length to generate fourth parities and fourth cyclic redundancy codes;
writing the fifth data and the sixth data to the first memory devices and the second memory device; and
writing the third parities, the third cyclic redundancy codes, the fourth parities, and the fourth cyclic redundancy codes to the third memory device.

8. The method of claim 7, wherein a size of each of the third parities and the fourth parities is less than a size of each of the first parities and the second parities, and
a size of each of the third cyclic redundancy codes and the fourth cyclic redundancy codes is less than a size of each of the first cyclic redundancy codes and the second cyclic redundancy codes.

9. The method of claim 7, further comprising:
receiving seventh data corresponding to the burst length from the first memory devices;
receiving eighth data corresponding to the first partial burst length from the second memory device;
receiving ninth data corresponding to the burst length from the third memory device;
decoding a portion of the seventh data corresponding to the first partial burst length, and the eighth data using a portion of the ninth data; and
decoding a remaining portion of the seventh data corresponding to the second partial burst length using a remaining portion of the ninth data.

10. The method of claim 9, further comprising:
assigning a second region of the second memory device corresponding to the second partial burst length in response to a determination that a second-type replacement is required.

11. The method of claim 10, wherein the determination that the second-type replacement is required is made, when after the first region of the second memory device corresponding to the second partial burst length is assigned, when an error is detected in a first memory device among the first memory devices in one of the decoding of the portion of the seventh data corresponding to the first partial burst length, and the decoding of the remaining portion of the seventh data corresponding to the second partial burst length, and the error is detected at a same location of the first memory device a number of times.

12. The method of claim 4, further comprising:
assigning a first region of the second memory device corresponding to the first partial burst length, and a second region of the second memory device corresponding to the second partial burst length in response to a determination that a third-type replacement is required.

13. The method of claim 12, wherein the determination that the third-type replacement is required is made when errors are detected in a first memory device among the first memory devices in one of the decoding of the portion of the third data and the decoding of the remaining portion of the third data, and the errors are detected at a same location a number of times.

14. A method for accessing a memory module including first memory devices, a second memory device, and a third memory device, the method comprising:
storing data in the first memory devices;
storing first error correction codes in the second memory device and the third memory device; and
when an error occurs in at least one memory device among the first memory devices, replacing at least one portion of the at least one memory device with at least one portion of the second memory device.

15. The method of claim 14, further comprising:
storing second error correction codes in the third memory device, after the at least one portion of the second memory device replaces the at least one portion of the at least one memory device,
wherein the second error correction codes support at least single device data correction (SDDC) of data.

16. The method of claim 14, wherein the second memory device and the third memory device are partial regions included in a single memory device.

17. The method of claim 16, wherein a number of the first memory devices is 8,
each of the first memory devices, the second memory device, and the third memory device is a double data rate fifth-generation synchronous dynamic random access memory (DDR5 SDRAM), and the memory module is a dual in-line memory module (DIMM).

18. A method for accessing a memory module including first memory devices, a second memory device, and a third memory device, the method comprising:
- performing first training on the first memory devices, the second memory device, and the third memory device in response to power-on of the memory module;
- in the first training, when a first faulty memory device is detected among the first memory devices, storing first data in the second memory device and remaining memory devices among the first memory devices, other than the first faulty memory device, and a first error correction code in the third memory device after the first training is completed; and
- in the first training, when the first faulty memory device is not detected among the first memory devices, storing the first data in the first memory devices and a second error correction code in the second memory device and the third memory device after the first training is completed.

19. The method of claim 18, wherein the memory module further includes fourth memory devices, a fifth memory device, and a sixth memory device, and the method further comprises:
- performing second training on the fourth memory devices, the fifth memory device, and the sixth memory device in response to power-on of the memory module;
- in the second training, when a second faulty memory device is detected among the fourth memory devices, storing second data in the fifth memory device and remaining memory devices of the fourth memory devices, other than the second faulty memory device, and a third error correction code in the sixth memory device after the second training is completed; and
- in the second training, when the second faulty memory device is not detected among the fourth memory devices, storing the second data in the fourth memory devices and a fourth error correction code in the fifth memory device and the sixth memory device after the second training is completed.

* * * * *